(12) United States Patent
Bekele

(10) Patent No.: US 8,709,558 B2
(45) Date of Patent: Apr. 29, 2014

(54) STERILIZABLE FILM FOR ASEPTIC PACKAGING

(75) Inventor: Solomon Bekele, Taylors, SC (US)

(73) Assignee: Cryovac, Inc., Duncan, SC (US)

( * ) Notice: Subject to any disclaimer, the term of this patent is extended or adjusted under 35 U.S.C. 154(b) by 173 days.

(21) Appl. No.: 13/159,575

(22) Filed: Jun. 14, 2011

(65) Prior Publication Data

US 2012/0318698 A1 Dec. 20, 2012

(51) Int. Cl.
*B32B 27/08* (2006.01)
*B32B 27/16* (2006.01)
*B32B 7/12* (2006.01)
*B32B 27/30* (2006.01)
*B32B 27/32* (2006.01)
*B32B 27/34* (2006.01)

(52) U.S. Cl.
CPC .............. *B32B 27/08* (2013.01); *B32B 2250/24* (2013.01); *B32B 2270/00* (2013.01); *B32B 2307/31* (2013.01); *B32B 2307/4023* (2013.01); *B32B 2307/51* (2013.01); *B32B 2307/75* (2013.01); *B32B 2439/46* (2013.01); *B32B 2250/05* (2013.01); *B32B 27/16* (2013.01); *B32B 27/306* (2013.01); *B32B 27/32* (2013.01); *B32B 27/325* (2013.01); *B32B 27/34* (2013.01); *B32B 7/12* (2013.01)

USPC ................ 428/35.2; 428/35.4; 428/474.4

(58) Field of Classification Search
CPC ............ B32B 2250/05; B32B 2250/24; B32B 2270/00; B32B 2307/31; B32B 2307/4023; B32B 2307/51; B32B 2307/75; B32B 2439/46; B32B 2439/70; B32B 7/12; B32B 27/08; B32B 27/16; B32B 27/306; B32B 27/32; B32B 27/325
USPC ..................................... 428/35.2, 35.4, 474.4
See application file for complete search history.

(56) References Cited

U.S. PATENT DOCUMENTS

| | | |
|---|---|---|
| 2006/0228502 A1 | 10/2006 | Bekele |
| 2007/0110853 A1 | 5/2007 | Bekele |
| 2009/0123611 A1 | 5/2009 | Bekele |
| 2011/0027428 A1 | 2/2011 | Bekele |

*Primary Examiner* — Michele L Jacobson
(74) *Attorney, Agent, or Firm* — Ashley D. Wilson

(57) ABSTRACT

The presently disclosed subject matter is directed to a multi-layer coextruded sterilizable film that can be used for aseptic packaging applications. The film comprises an outer layer comprising a blend of a cyclic olefin copolymer with a glass transition temperature of at least 80° C. and an olefinic copolymer with a melting point of at least 125° C. The film has a storage modulus of at least $10^9$ dynes/cm$^2$ at temperatures of up to 140° C. An aseptic package and a method of making an aseptic package are also disclosed.

7 Claims, 8 Drawing Sheets

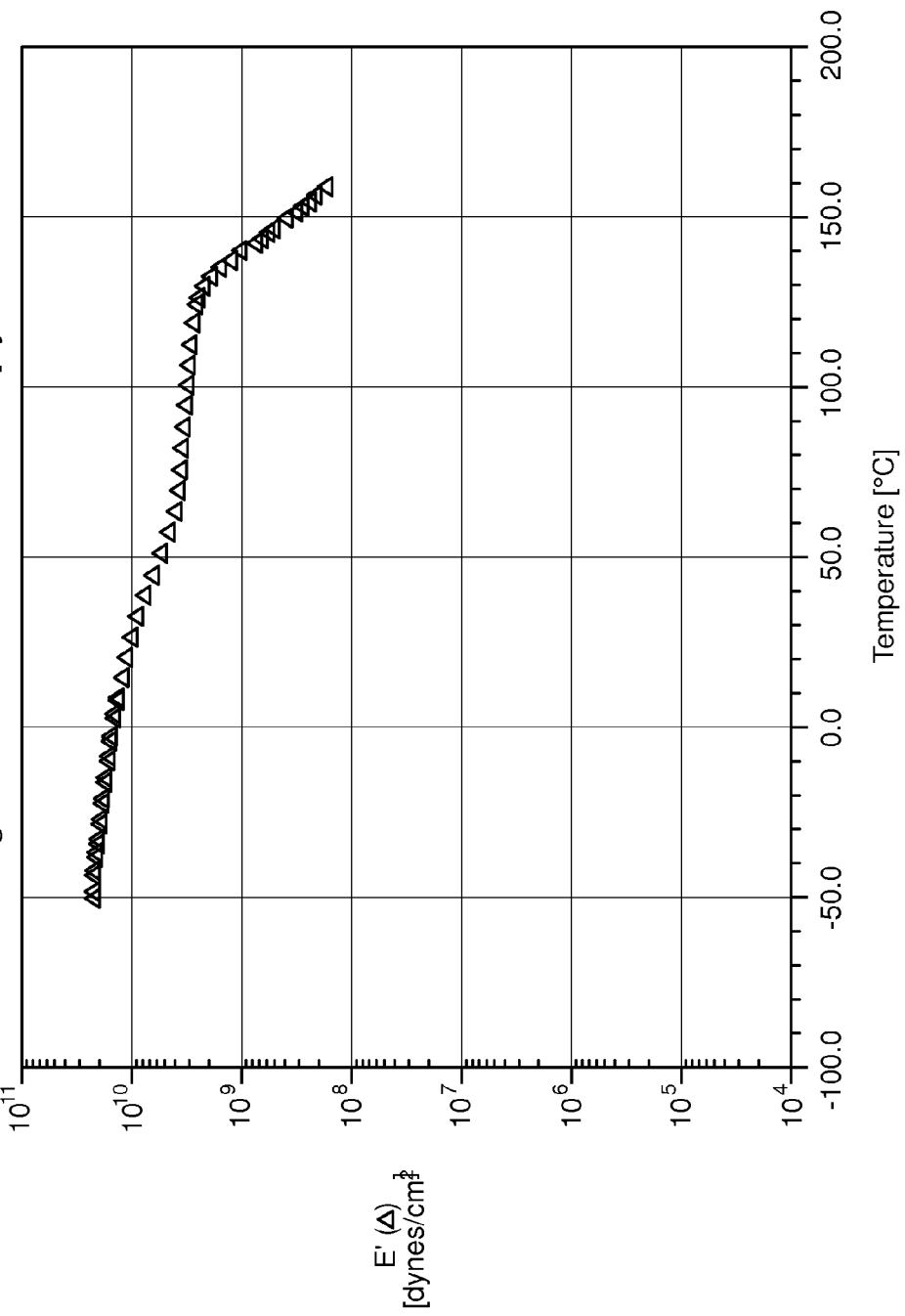

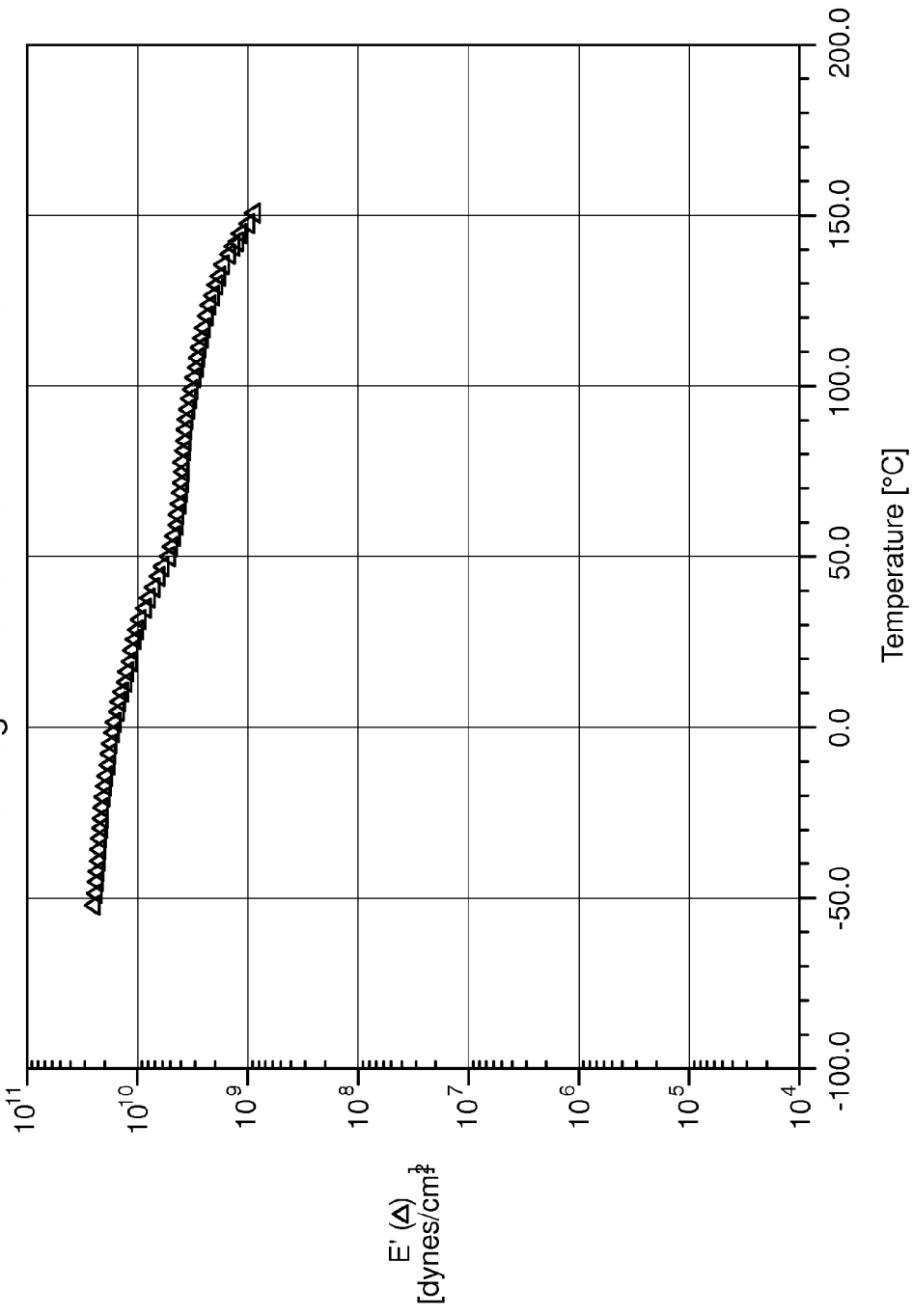

STERILIZABLE FILM FOR ASEPTIC PACKAGING

FIELD OF THE INVENTION

The presently disclosed subject matter relates generally a film that can be used for aseptic packaging, and to a package and method of making a package using the disclosed film.

BACKGROUND

Aseptic packaging is a well known method of packaging items (such as food products) when sterilization of both the item and the packaging material containing the item is required. To this end, it is known to produce a sterilized package wherein a sterile food product is placed in a sterilized container (such as a pouch) to preserve the food product for later storage or use. Various methods of sterilizing the container and filling the container with the sterilized product are known, such as (but not limited to) the use of hydrogen peroxide.

In aseptic packaging applications where hydrogen peroxide sterilization treatments are used (such as vertical or horizontal form, fill, and seal pouch packaging), some films can unduly stretch or improperly seal after pouch formation and filling with sterilized product at elevated temperatures. These films are thus less desirable or unsuitable for end use applications where dimensional stability of the packaging material is of concern.

Printed information is commonly placed on the outside surface of a package to identify the product, supplier, and the like. However, during manufacturing of the package, it is common for such surface printing to be directly exposed to a heated seal bar. As a result, the surface printing can become smeared or otherwise degraded. In addition, package surface printing is also frequently exposed to other physical abuses during distribution and display of the packaged product, causing the clarity and presentation of the printed image to be degraded. Further, when hydrogen peroxide is used during aseptic packaging, the integrity of the printed image can be compromised as a result of incompatibility with the sterilant used.

The presently disclosed film can be used for aseptic packaging applications and does not exhibit the problems with stretching or pouch formation common in the prior art. In addition, the disclosed film can be trap printed to avoid the problems experienced in the art with external printing applications.

SUMMARY

In some embodiments, the presently disclosed subject matter is directed to a coextruded sterilizable film for aseptic packaging comprising: (a) a core layer having first and second major surfaces, said core layer comprising a polyamide; (b) a first intermediate layer adjacent to the first major surface of the core layer, said first intermediate layer comprising ethylene vinyl alcohol copolymer; (c) a second intermediate layer adjacent to the second major surface of the core layer, said second intermediate layer comprising a polyamide; (d) a first outer layer comprising an olefinic copolymer; (e) a second outer layer comprising a blend of a cyclic olefin copolymer and an olefinic copolymer, wherein said cyclic olefin copolymer has a glass transition temperature of at least 80° C., and wherein said olefinic copolymer has a melting point of at least 125° C.; (f) a first tie layer adhering the first intermediate layer to the first outer layer; and (g) a second tie layer adhering the second intermediate layer to the second outer layer. In some embodiments, the film has a storage modulus of at least $10^9$ dynes/cm$^2$ at temperatures up to 140° C.

In some embodiments, the presently disclosed subject matter is directed to an aseptic package comprising a sterilized product and a sterilized pouch into which the sterilized product is disposed. In some embodiments, the sterilized pouch comprises a coextruded multilayer film comprising: (a) a core layer having first and second major surfaces, said core layer comprising a polyamide; (b) a first intermediate layer adjacent to the first major surface of the core layer, said first intermediate layer comprising ethylene vinyl alcohol copolymer; (c) a second intermediate layer adjacent to the second major surface of the core layer, said second intermediate layer comprising a polyamide; (d) a first outer layer comprising an olefinic copolymer; (e) a second outer layer comprising a blend of a cyclic olefin copolymer and an olefinic copolymer, wherein said cyclic olefin copolymer has a glass transition temperature of at least 80° C., and wherein said olefinic copolymer has a melting point of at least 125° C.; (f) a first tie layer adhering the first intermediate layer to the first outer layer; and (g) a second tie layer adhering the second intermediate layer to the second outer layer. In some embodiments, the film has a storage modulus of at least $10^9$ dynes/cm$^2$ at temperatures up to 140° C.

In some embodiments, the presently disclosed subject matter is directed to a method of making an aseptic package, said method comprising sterilizing a product, sterilizing a coextruded multilayer film, forming the sterilized film into a pouch, filling the pouch with the sterilized product, and sealing the pouch. In some embodiments, said film comprises: (a) a core layer having first and second major surfaces, said core layer comprising a polyamide; (b) a first intermediate layer adjacent to the first major surface of the core layer, said first intermediate layer comprising ethylene vinyl alcohol copolymer; (c) a second intermediate layer adjacent to the second major surface of the core layer, said second intermediate layer comprising a polyamide; (d) a first outer layer comprising an olefinic copolymer; (e) a second outer layer comprising a blend of a cyclic olefin copolymer and an olefinic copolymer, wherein said cyclic olefin copolymer has a glass transition temperature of at least 80° C., and wherein said olefinic copolymer has a melting point of at least 125° C.; (f) a first tie layer adhering the first intermediate layer to the first outer layer; and (g) a second tie layer adhering the second intermediate layer to the second outer layer. In some embodiments, said film has a storage modulus of at least $10^9$ dynes/cm$^2$ at temperatures up to 140° C.

In some embodiments, the presently disclosed subject matter is directed to a printed sterilizable laminate for aseptic packaging, said laminate comprising a first coextruded multilayer film, a second coextruded multilayer film, a printed image disposed on the outside surface of the first coextruded multilayer film or the inside surface of the second coextruded multilayer film, and an adhesive that bonds the first outer layer of the first coextruded multilayer film to the second outer layer of the second coextruded multilayer film. In some embodiments, the first coextruded multilayer film comprises: (a) a core layer having first and second major surfaces, said core layer comprising a polyamide; (b) a first intermediate layer adjacent to the first major surface of the core layer, said first intermediate layer comprising ethylene vinyl alcohol copolymer; (c) a second intermediate layer adjacent to the second major surface of the core layer, said second intermediate layer comprising a polyamide; (d) a first outer layer comprising an olefinic copolymer; (e) a second outer layer comprising a blend of a cyclic olefin copolymer and an olefinic copolymer, wherein said cyclic olefin copolymer has a glass transition temperature of at least 80° C., and wherein said olefinic copolymer has a melting point of at least 125° C.; (f) a first tie layer adhering the first intermediate layer to the first outer layer; and (g) a second tie layer adhering the second intermediate layer to the second outer layer. In some embodiments, the second coextruded multilayer film comprises: (a) a core layer having first and second major surfaces, said core layer comprising a polyamide; (b) a first intermediate layer adjacent to the first major surface of the core layer, said first intermediate layer comprising ethylene vinyl alcohol copolymer; (c) a second intermediate layer adjacent to the second major surface of the core layer, said second intermediate layer comprising a polyamide; (d) a first outer layer comprising an olefinic copolymer; (e) a second outer layer comprising a blend of a cyclic olefin copolymer and an olefinic copolymer, wherein said cyclic olefin copolymer has a glass transition temperature of at least 80° C., and wherein said olefinic copolymer has a melting point of at least 125° C.; (f) a first tie layer adhering the first intermediate layer to the first outer layer; and (g) a second tie layer adhering the second intermediate layer to the second outer layer. In some embodiments, said laminate has a storage modulus of at least $10^9$ dynes/cm$^2$ at temperatures up to 140° C.

In some embodiments, the presently disclosed subject matter is directed to an aseptic package comprising a sterilized product and a sterilized pouch into which the sterilized product is disposed. In some embodiments, the disclosed pouch comprises a printed laminate comprising a first coextruded multilayer film comprising: (a) a core layer having first and second major surfaces, said core layer comprising a polyamide; (b) a first intermediate layer adjacent to the first major surface of the core layer, said first intermediate layer comprising ethylene vinyl alcohol copolymer; (c) a second intermediate layer adjacent to the second major surface of the core layer, said second intermediate layer comprising a polyamide; (d) a first outer layer comprising an olefinic copolymer; (e) a second outer layer comprising a blend of a cyclic olefin copolymer and an olefinic copolymer, wherein said cyclic olefin copolymer has a glass transition temperature of at least 80° C., and wherein said olefinic copolymer has a melting point of at least 125° C.; (f) a first tie layer adhering the first intermediate layer to the first outer layer; and (g) a second tie layer adhering the second intermediate layer to the second outer layer. In some embodiments, the disclosed laminate comprises a second coextruded multilayer film comprising: (a) a core layer having first and second major surfaces, said core layer comprising a polyamide; (b) a first intermediate layer adjacent to the first major surface of the core layer, said first intermediate layer comprising ethylene vinyl alcohol copolymer; (c) a second intermediate layer adjacent to the second major surface of the core layer, said second intermediate layer comprising a polyamide; (d) a first outer layer comprising an olefinic copolymer; (e) a second outer layer comprising a blend of a cyclic olefin copolymer and an olefinic copolymer, wherein said cyclic olefin copolymer has a glass transition temperature of at least 80° C., and wherein said olefinic copolymer has a melting point of at least 125° C.; (f) a first tie layer adhering the first intermediate layer to the first outer layer; and (g) a second tie layer adhering the second intermediate layer to the second outer layer. In some embodiments, the printed laminate comprises a printed image disposed on the outside surface of the first coextruded multilayer film or the inside surface of the second coextruded multilayer film and an adhesive that bonds the first outer layer of the first coextruded multilayer film to the second outer layer of the second coextruded multilayer film. In some embodiments, said laminate has a storage modulus of at least $10^9$ dynes/cm$^2$ at temperatures up to 140° C.

In some embodiments, the presently disclosed subject matter is directed to a method of making an aseptic package, said method comprising sterilizing a product, sterilizing a printed laminate, forming the sterilized laminate into a pouch, filling the pouch with the sterilized product, and sealing the pouch. In some embodiments, said laminate comprises a first coextruded multilayer film comprising: (a) a core layer having first and second major surfaces, said core layer comprising a polyamide; (b) a first intermediate layer adjacent to the first major surface of the core layer, said first intermediate layer comprising ethylene vinyl alcohol copolymer; (c) a second intermediate layer adjacent to the second major surface of the core layer, said second intermediate layer comprising a polyamide; (d) a first outer layer comprising an olefinic copolymer; (e) a second outer layer comprising a blend of a cyclic olefin copolymer and an olefinic copolymer, wherein said cyclic olefin copolymer has a glass transition temperature of at least 80° C., and wherein said olefinic copolymer has a melting point of at least 125° C.; (f) a first tie layer adhering the first intermediate layer to the first outer layer; and (g) a second tie layer adhering the second intermediate layer to the second outer layer. In some embodiments, said laminate comprises a second coextruded multilayer film comprising: (a) a core layer having first and second major surfaces, said core layer comprising a polyamide; (b) a first intermediate layer adjacent to the first major surface of the core layer, said first intermediate layer comprising ethylene vinyl alcohol copolymer; (c) a second intermediate layer adjacent to the second major surface of the core layer, said second intermediate layer comprising a polyamide; (d) a first outer layer comprising an olefinic copolymer; (e) a second outer layer comprising a blend of a cyclic olefin copolymer and an olefinic copolymer, wherein said cyclic olefin copolymer has a glass transition temperature of at least 80° C., and wherein said olefinic copolymer has a melting point of at least 125° C.; (f) a first tie layer adhering the first intermediate layer to the first outer layer; and (g) a second tie layer adhering the second intermediate layer to the second outer layer. In some embodiments, said laminate has a storage modulus of at least $10^9$ dynes/cm$^2$ at temperatures up to 140° C.

BRIEF DESCRIPTION OF THE DRAWINGS

FIG. 4c is a graph of the storage modulus of Film 3a as a function of temperature.

FIG. 4f is a graph of the storage modulus of Film 5 as a function of temperature.

DETAILED DESCRIPTION

I. General Considerations

The presently disclosed subject matter is directed to a multilayer coextruded aseptic film that includes a first outer layer that comprises a blend of a cyclic olefin copolymer with a glass transition temperature (Tg) of at least 80° C. and an olefinic copolymer with a melting point of at least 125° C. The film has a storage modulus of at least $10^9$ dynes/cm$^2$ at temperatures of up to 140° C. (ASTM D-5026). The film can be used to construct a wide variety of packages (including stand-up pouches) that can be filled under aseptic conditions.

Figure 1:
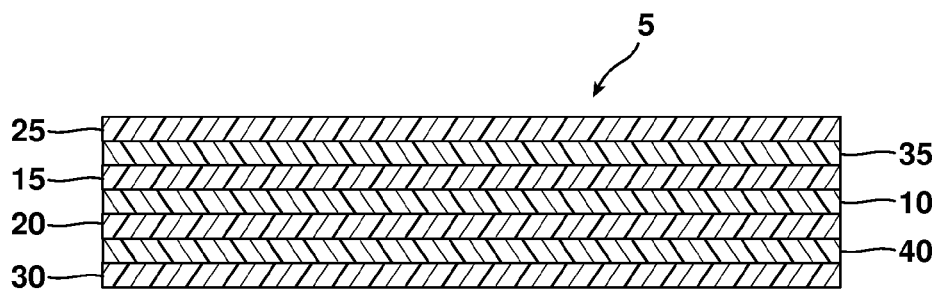
FIG. 1 is a schematic cross-sectional view of a sterilizable film in accordance with some embodiments of the presently disclosed subject matter.

FIG. 1 illustrates one embodiment of the disclosed sterilizable film. Particularly, multilayer film 5 includes core layer 10 comprising polyamide. Multilayer film 5 also comprises first and second intermediate layers 15, 20 directly adjacent to either side of core layer 10. First intermediate layer 15 comprises ethylene vinyl alcohol copolymer and second intermediate layer 20 comprises a polyamide. Film 5 also includes first outer layer 25 comprising an olefinic copolymer. Second outer layer 30 comprises a blend of cyclic olefin copolymer with a Tg of at least 80° C. and an olefinic copolymer with a melting point of at least 125° C. First tie layer 35 adheres first intermediate layer 15 to first outer layer 25. Similarly, second tie layer 40 adheres second intermediate layer 20 to second outer layer 30.

Figure 2:
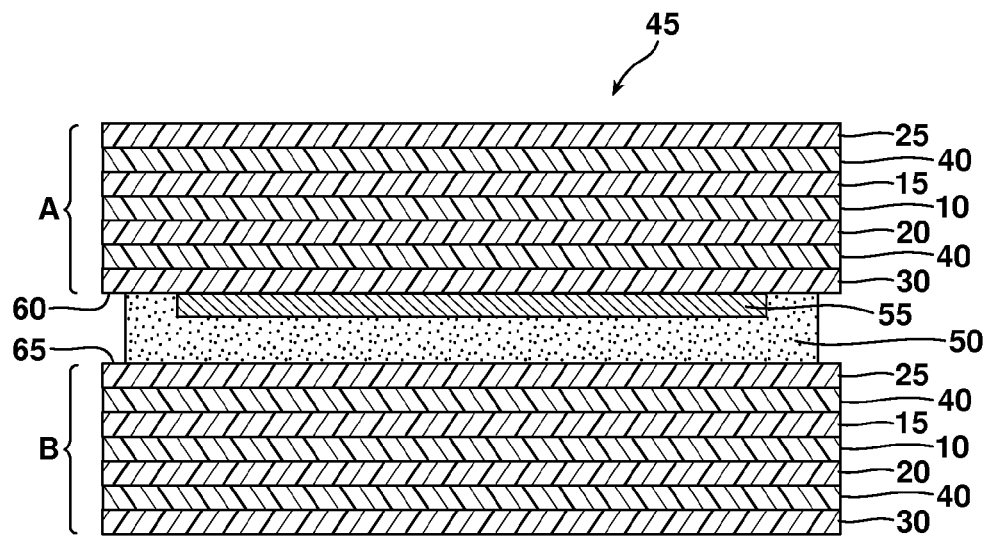
FIG. 2 is a schematic cross-sectional view of a sterilizable laminate in accordance with some embodiments of the presently disclosed subject matter.

In some embodiments, film 5 can be trap printed to itself or to another film. To this end, FIG. 2 illustrates a printed sterilizable laminate in accordance with some embodiments of the presently disclosed subject matter. Laminate 45 includes first and second coextruded films A and B. In some embodiments, films A and/or B can be film 5. Films A and B can be adhered together using a suitable laminating adhesive 50 (such as, but not limited to, polyurethane). The laminating adhesive can be applied to layer 30 of Film A and/or layer 25 of Film B. Printed image 55 is shown installed on Film A inside surface 60, although the presently disclosed subject matter also includes embodiments wherein the printed image is installed on Film B inside surface 65. As shown in the embodiment of FIG. 2, Films A and B can be identical with respect to the number and placement of layers. Thus, core layer 10 of Film A can be the same composition and have the same relative position as core layer 10 of Film B. However, the presently disclosed subject matter also includes embodiments wherein Films A and B are not identical with respect to number and/or placement of layers.

II. Definitions

While the following terms are believed to be well understood by one of ordinary skill in the art, the following definitions are set forth to facilitate explanation of the presently disclosed subject matter.

Unless defined otherwise, all technical and scientific terms used herein have the same meaning as commonly understood to one of ordinary skill in the art to which the presently disclosed subject matter belongs.

Following long standing patent law convention, the terms "a", "an", and "the" refer to "one or more" when used in the subject application, including the claims. Thus, for example, reference to "a package" includes a plurality of such packages, and so forth.

Unless indicated otherwise, all numbers expressing quantities of components, reaction conditions, and so forth used in the specification and claims are to be understood as being modified in all instances by the term "about." Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, percentage, and the like can encompass variations of, and in some embodiments, ±20%, in some embodiments ±10%, in some embodiments ±5%, in some embodiments ±1%, in some embodiments ±0.5%, and in some embodiments ±0.1%, from the specified amount, as such variations are appropriated in the disclosed package and methods.

The term "aseptic" as used herein refers to a process wherein a sterilized container or packaging material (such as, for example, a stand-up pouch) is filled with a sterilized product (such as a food product) in a hygienic environment. The product is thus rendered shelf-stable in normal non-refrigerated conditions. The term "aseptic" can also refer to the resulting filled and closed package. The package or packaging material and the food product are typically separately sterilized before filling.

As used herein, the term "copolymer" refers to polymers formed by the polymerization reaction of at least two different monomers. For example, the term "copolymer" includes the copolymerization reaction product of ethylene and an alpha-olefin, such as 1-hexene.

The term "core layer" as used herein refers to an internal layer of a multilayer film. In some embodiments, the core layer can be the middle layer of a film (i.e., layer 4 in a 7 layer film).

The term "cyclic olefin" as used herein refers to a compound containing a polymerizable carbon-carbon double bond that is either contained within an alicyclic ring (such as, for example, norbornene) or linked to an alicyclic ring (such as, for example, vinyl cyclohexane). Polymerization of the cyclic olefin provides a polymer comprising an alicyclic ring as part of or pendant to the polymer backbone.

The term "cyclic olefin copolymer" as used herein refers to a copolymer formed by polymerization of a cyclic olefin with a comonomer. One non-limiting example of a cyclic olefin copolymer is ethylene/norbornene copolymer, such as that supplied by Ticona under the trademark TOPAS™, by Zeon under the trademark ZEONOR™ and by Mitsui under the trademark APEL™.

The term "ethylene/alpha-olefin copolymer" ("EAO") as used herein refers to copolymers of ethylene with one or more comonomers selected from $C_3$ to $C_{10}$ alpha-olefins, such as propene, butene-1, hexene-1, octene-1, and the like in which the molecules of the copolymers comprise long polymer chains with relatively few side chain branches arising from the alpha-olefin which was reacted with ethylene. The molecular structure is to be contrasted with conventional high pressure low or medium density polyethylenes that are highly branched with respect to EAOs and which high pressure polyethylenes contain both long chain and short chain branches. EAO includes such heterogeneous materials as linear medium density polyethylene (LMDPE), linear low density polyethylene (LLDPE), and very low and ultra low density polyethylene (VLDPE and ULDPE), such as DOWLEX™ and ATTANE™ resins supplied by Dow, and ESCORENE™ resins supplied by Exxon, as well as linear homogeneous ethylene/alpha olefin copolymers (HEAO)

such as TAFMER™ resins supplied by Mitsui Petrochemical Corporation, EXACT™ and EXCEED™ resins supplied by Exxon, long chain branched (HEAO) AFFINITY™ resins and ELITE™ resins supplied by the Dow Chemical Company, ENGAGE™ resins supplied by DuPont Dow Elastomers, and SURPASS™ resins supplied by Nova Chemicals.

The term "ethylene vinyl alcohol copolymer" or "EVOH" as used herein refers to saponified or hydrolysed products of ethylene/vinyl ester copolymer.

As used herein, the term "film" can be used in a generic sense to include plastic web, regardless of whether it is film or sheet.

The term "food product" as used herein refers to any nourishing substance that is eaten, drunk, or otherwise taken into the body to sustain life, provide energy, promote growth, and/or the like.

As used herein, the term "glass transition temperature" (sometimes abbreviated herein as "Tg") refers to the approximate midpoint of the temperature range over which an amorphous polymer undergoes a reversible change from a hard, glassy, or brittle condition to a flexible or elastomeric condition, and can be determined in accordance with ISO 3146-C or ASTM D-3418.

The term "laminate" as used herein refers to a multiple-film composite structure having two or more films bonded together by any suitable means.

The term "melting point" as used herein refers to an endotherm crystalline melting peak as determined by Differential Scanning Calorimetry (DSC) in accordance with ASTM D-3417.

The term "olefin" as used herein refers to any one of a class of monounsaturated, aliphatic hydrocarbons of the general formula $C_nH_{2n}$, such as ethylene, propylene, and butene. The term can also include aliphatics containing more than one double bond in the molecule, such as a diolefin or diene.

The term "olefinic" as used herein refers to a polymer or copolymer derived at least in party from an olefin monomer.

The term "package" as used herein refers to packaging materials configured around a product being packaged, and can include (but is not limited to) bags, pouches, stand-up pouches, and the like.

The term "polyamide" as used herein refers to polymers having amide linkages along the molecular chain, and preferably to synthetic polyamides such as nylons. The term "polyamide" further encompasses both polymers comprising repeating units derived from monomers (such as caprolactam) which polymerize to form a polyamide, as well as polymers of diamines and diacids, and copolymers of two or more amide monomers (including nylon terpolymers).

As used herein, the term "polymer" refers to the product of a polymerization reaction, and can be inclusive of homopolymers, copolymers, terpolymers, etc. In some embodiments, the layers of a film can consist essentially of a single polymer, or can have additional polymer together therewith, i.e., blended therewith.

The term "polypropylene" refers to a propylene homopolymer or copolymer having greater than 50 mole percent propylene prepared by conventional heterogeneous Ziegler-Natta type initiators or by single site catalysis. Propylene copolymers are typically prepared with ethylene or butene comonomers.

The term "pouch" as used herein includes a pouch, a bag, or like containers, either pre-made or made at the point of bagging.

As used herein, the term "pouch fitment" refers to a means for accessing a container (such as a pouch) and can include, without limitation, valves, ports, port enclosure assemblies, and other means for accessing a container.

As used herein, the term "seal" refers to any seal of a first region of an outer film surface to a second region of an outer film surface, including heat or any type of adhesive material, thermal or otherwise. In some embodiments, the seal can be formed by heating the regions to at least their respective seal initiation temperatures. The sealing can be performed by any one or more of a wide variety of means, including (but not limited to) using a heat seal technique (e.g., melt-bead sealing, thermal sealing, impulse sealing, dielectric sealing, radio frequency sealing, ultrasonic sealing, hot air, hot wire, infrared radiation).

As used herein, the phrases "seal layer", "sealing layer", "heat seal layer", and "sealant layer", refer to an outer film layer, or layers, involved in the sealing of the film to itself, another film layer of the same or another film, and/or another article that is not a film. It should also be recognized that in general, up to the outer 3 mils of a film can be involved in the sealing of the film to itself or another layer. In general, a sealant layer sealed by heat-sealing layer comprises any thermoplastic polymer. In some embodiments, the heat-sealing layer can comprise, for example, thermoplastic polyolefin, thermoplastic polyamide, thermoplastic polyester, and thermoplastic polyvinyl chloride. In some embodiments, the heat-sealing layer can comprise thermoplastic polyolefin.

As used herein, the term "sterilize" or "sterilization" refers to a wide variety of techniques employed to attenuate, kill or eliminate harmful or infectious agents. Examples of sterilization procedures include, for example, gas plasma sterilization, steam sterilization, ozone sterilization, hydrogen peroxide sterilization, ethylene oxide sterilization, and irradiation. The term "sterilizable" as used herein refers to an item that can be sterilized.

The term "storage modulus" as used herein refers to the parameter that is related to the elastic behavior of a material undergoing small cyclic deformations, generally obtained by dynamic mechanical spectroscopic techniques. Storage modulus is measured in dynes/cm$^2$ and is determined by ASTM D-5026.

As used herein, the term "tie layer" refers to an internal film layer having the primary purpose of adhering two layers to one another. In some embodiments, tie layers can comprise any nonpolar polymer having a polar group grafted thereon, such that the polymer is capable of covalent bonding to polar polymers such as polyamide and ethylene/vinyl alcohol copolymer. In some embodiments, tie layers can comprise at least one member selected from the group including, but not limited to, modified polyolefin, modified ethylene/vinyl acetate copolymer, and/or homogeneous ethylene/alpha-olefin copolymer. In some embodiments, tie layers can comprise at least one member selected from the group consisting of anhydride modified grafted linear low density polyethylene, anhydride grafted low density polyethylene, homogeneous ethylene/alpha-olefin copolymer, and/or anhydride grafted ethylene/vinyl acetate copolymer.

All compositional percentages used herein are presented on a "by weight" basis, unless designated otherwise.

Although the majority of the above definitions are substantially as understood by those of skill in the art, one or more of the above definitions can be defined hereinabove in a manner differing from the meaning as ordinarily understood by those of skill in the art, due to the particular description herein of the presently disclosed subject matter.

III. The Disclosed Film

III.A. Generally

As set forth in FIG. 1, film 5 includes core layer 10, first and second intermediate layers 15, 20 directly adjacent to either side of the core layer, first outer layer 25, second outer layer 30, and first and second tie layers 35, 40 that adhere the intermediate layers to the outer and second outer layers. Additional materials can be incorporated into one or more of the film layers as appropriate, including (but not limited to) antiblock agents, slip agents, antifog agents, and the like. Other additives can also be included in one or more film layers to impart properties desired for the particular article being manufactured, such as (but not limited to) fillers, pigments, dyes, antioxidants, stabilizers, processing aids, plasticizers, fire retardants, UV absorbers, and the like.

Film 5 can have any total thickness desired, and each layer can have any thickness desired, so long as the film provides the desired properties for the particular packaging operation in which the film is used. In some embodiments, the total film thickness can be about 0.5 to 15 mils; in some embodiments, from about 1 to 12 mils; in some embodiments, from about 2 to 10 mils; in some embodiments, from about 3 to 8 mils; and in some embodiments, from about 4 to 6 mils. Thus, film 5 can have a thickness of 0.5, 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, or 15 mils. It should also be noted that in some embodiments FIG. 1 is not drawn to scale and the layers can be of varying thicknesses compared to one another.

Although a 7-layer film is depicted in FIG. 1, the presently disclosed subject matter can include films comprising less or more than 7 layers. Particularly, in some embodiments, the disclosed film can have from 5 to 20 layers; in some embodiments, from 5 to 12 layers; and in some embodiments, from 5 to 10 layers. Thus, the disclosed film can have 5, 6, 7, 8, 9, 10, 11, 12, 13, 14, 15, 16, 17, 18, 19, or 20 layers.

III.B. Core Layer 10

Core layer 10 of the film structure described above can comprise any suitable polyamide. For example, in some embodiments, the polyamide of core layer 10 can comprise a semi-crystalline polyamide (such as nylon 6), an amorphous polyamide, and/or a semi-crystalline polyamide. In some embodiments, the core layer of the disclosed film comprises 100% polyamide, based on the total weight of the layer.

III.C. First Intermediate Layer 15

First intermediate layer 15 of the film structure described above comprises ethylene vinyl alcohol copolymer ("EVOH"). As would be readily apparent to one of ordinary skill in the art, EVOH represents a family of copolymers made by hydrolyzing ethylene-vinyl acetate copolymers with high vinyl acetate content. EVOH useful for first intermediate layer 15 can have an ethylene content of 20 to 48 mol %, based on the total weight of the layer. Thus, in some embodiments, the EVOH of the first intermediate layer can have an ethylene content of about 20, 21, 22, 23, 24, 25, 26, 27, 28, 29, 30, 31, 32, 33, 34, 35, 36, 37, 38, 39, 40, 41, 42, 43, 44, 45, 46, 47, or 48 mol %. In some embodiments, the EVOH can include (but is not limited to) saponified or hydrolyzed ethylene/vinyl acetate copolymers, such as those having a degree of hydrolysis of at least 50%, preferably of at least 85%. In some embodiments, the first intermediate layer comprises 100% EVOH, based on the total weight of the layer.

III.D. Second Intermediate Layer 20

Second intermediate layer 20 of the film structure described above can comprise any suitable polyamide. For example, in some embodiments, the polyamide of second intermediate layer 20 can comprise a semi-crystalline polyamide (such as nylon 6), an amorphous polyamide, and/or a semi-crystalline polyamide, such as (but not limited to) copolyamide MXD6/MXDI. In some embodiments, the second intermediate layer comprises 100% polyamide, based on the total weight of the layer.

III.E. First Outer Layer 25

First outer layer 25 of the film structure described above comprises at least one olefinic polymer. Thus, polymers that can be used for the first outer layer can include (but are not limited to) ethylene polymer or copolymer, ethylene/alpha olefin copolymer, ethylene/vinyl acetate copolymer, ionomer reins, ethylene/acrylic or methacrylic acid copolymer, ethylene/acrylate or methacrylate copolymer, low density polyethylene, linear low density polyethylene, high density polyethylene, propylene homopolymers, propylene/ethylene copolymer, or blends of any of these materials. In some embodiments, first outer layer 25 can be the food contact/sealant layer of film 5. In some embodiments, the first outer layer can comprise about 70-100% of at least one olefinic polymer, based on the total weight of the layer. Thus, in some embodiments, the first outer layer can comprise about 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100% of at least one olefinic copolymer, based on the total weight of the layer.

III.F. Second Outer Layer 30

Second outer layer 30 of the film structure described above comprises a blend of an amorphous cyclic olefin copolymer and an olefinic copolymer. Specifically, the amorphous cyclic olefin copolymer is characterized by a glass transition temperature (Tg) of at least 80° C. (ASTM D-3418). Thus, in some embodiments, the amorphous cyclic olefin copolymer can have a Tg of about 80° C., 85° C., 90° C., 95° C., 100° C., 105° C., 110° C., 115° C., 120° C., 125° C., 130° C., 135° C., 140° C., 145° C., 150° C., 155° C., 160° C., 165° C., or 170° C. An example of a suitable cyclic olefin copolymer that can be used in second outer layer 30 is ethylene/norbornene copolymer (available from Ticonas under the trademark TOPAS®).

The cyclic olefin copolymer of the second outer layer is blended with at least one olefinic copolymer (such as alpha-olefin copolymer) having a melting point of at least 125° C. (ASTM D-3417). In some embodiments, the olefinic copolymer can be blended with the cyclic olefin copolymer in an amount of about 50% or less. Thus, in some embodiments, the second outer layer can include a blend of an olefinic copolymer and a cyclic olefin copolymer such that the olefinic copolymer is present in an amount of about 50, 49, 48, 47, 46, 45, 44, 43, 42, 41, 40, 39, 38, 37, 36, 35, 34, 33, 32, 31, 30, 29, 28, 27, 26, 25, 24, 23, 22, 21, 20, 19, 18, 17, 16, 15, 14, 13, 12, 11, 10, 9, 8, 7, 6, 5, 4, 3, 2, or 1%, based on the total weight of the layer. Similarly, in some embodiments, the blend can include cyclic olefin copolymer in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99%, based on the total weight of the layer.

III.G. First and Second Tie Layers 35, 40

First and second tie layers 35, 40 can comprise any suitable polymeric adhesive that functions to bond two layers together. Thus, the first and second tie layers can comprise (but are not limited to) ethylene/vinyl acetate copolymer, anhydride grafted ethylene/vinyl acetate copolymer, anhydride grafted ethylene/alpha olefin copolymer, anhydride grafted polypropylene, anhydride grafted low density polyethylene, ethylene/methyl acrylate copolymer, anhydride grafted high density polyethylene, ionomer resin, ethylene/acrylic acid copolymer, ethylene/methacrylic acid copolymer, and anhydride grafted ethylene/methyl acrylate copolymer. Tie layers 35 and 40 can be identical or can differ. As would be apparent to those of ordinary skill in the art, the choice of tie layers in some embodiments can depend at least in part on the choice of polymer for first and second outer layers 25 and 30.

IV. Methods of Making the Disclosed Film

Any suitable method of making a film having the particular layers disclosed herein can be used to make a film in accordance with the presently disclosed subject matter. Thus, suitable methods can include (but are not limited to) tubular cast coextrusion, tubular blown coextrusion, flat cast extrusion, coextrusion, extrusion coating, lamination, slot die extrusion, and by other such techniques well known in the art. See, for example, U.S. Pat. Nos. 4,551,380; 5,139,878; 4,677,017; 5,094,788; 5,269,995; 3,773,882; and 4,054,632, the entire contents of which are incorporated by reference herein.

Preparation of compositions for each layer used in the disclosed film can be achieved in several different ways. The components can be brought into intimate contact by, for example, dry blending the materials and then passing the overall composition through a compounding extruder. Alternatively, the components can be fed directly to a mixing device such as a compounding extruder, high shear continuous mixer, two roll mill, or an internal mixer such as a Banbury mixer. It is also possible to achieve melt mixing in an extruder section of a coextrusion apparatus. Overall, the objective is to obtain a uniform dispersion of all ingredients, which can be achieved by inducing sufficient shear and heat to cause the components to melt. However, the time and temperature of mixing should be controlled as is normally done by one skilled in the art to avoid molecular weight degradation.

In some embodiments, the disclosed films can be cross-linked, depending upon the particular application in which such films are utilized. Cross-linking increases the structural strength of the film at elevated temperatures and/or increases the force at which the material can be stretched before tearing apart. Cross-linking can be performed by irradiation, i.e., bombarding the film with particulate or non-particulate radiation such as high-energy electrons from an accelerator or cobalt-60 gamma rays to cross-link the materials of the film. In some embodiments, the irradiation dosage level is in the range of from about 2 megarads (M.R.) to about 12 M.R. Any conventional cross-linking technique can be used. For example, electronic cross-linking can be carried out by curtain-beam irradiation. Chemical cross-linking techniques can also be employed, e.g., by the use of peroxides.

V. Methods of Using the Disclosed Film

V.A. Laminate 10

As depicted in FIG. 2, in some embodiments, film 5 can be used to construct trap-printed laminate 45. As would be known to those of ordinary skill in the art, printed image 55 can be disposed (i.e., trap printed) on Film A or Film B at the interface between the outside surface of Film A (layer 30) and the inside surface of Film B (layer 25). Image 55 can be printed on one or both of these surfaces before laminating the films together with adhesive, such that upon lamination the printed image is "trapped" between the two films. In some embodiments, the image can be "reverse trap printed" by printing the image onto the inside surface of Film B.

Thus, in some embodiments, the process for producing the printed sterilizable laminate of FIG. 2 can include constructing Films A and B, applying a lamination adhesive (such as, but not limited to, polyurethane) to the outside surface of Film A, reverse printing the inside surface of Film B with the desired printed image, and bringing Films A and B together in a conventional lamination step to create the final sterilizable laminate. As would be appreciated by those of ordinary skill in the art, the exact sequence of steps can be varied from that described herein, provided the resulting laminate is trap printed as described.

The trap printed image is visible through Film B to provide information to the viewer (e.g., the wholesale manufacturer, food processor, purchaser, etc.) of the filled aseptic pouch constructed from the disclosed laminate. The laminate can include a plurality of repeating printed images for each package (i.e., "scatter print") or the printed image can require registration (i.e., "registered print"). To form the printed image, one or more layers and/or patterns of ink are printed onto the film surface to be printed. The ink is selected to have acceptable ink adhesion, appearance, and heat resistance once printed on the film. The film can be printed by any suitable method, such as rotary screen, gravure, or flexographic techniques, as would be apparent to those of skill in the art. See, for example, Leach & Pierce, "The Printing Ink Manual", (5th ed., Kluwer Academic Publishers, 1993), which is incorporated herein in its entirety by reference.

To improve the adhesion of the ink to the outside surface of Film A (or the inside surface of Film B), the relevant surface can be treated or modified before printing. Suitable surface treatments and modifications can include mechanical treatments (such as corona treatment, plasma treatment, and flame treatment) and/or primer treatment. Surface treatments and modifications are known to those of skill in the art. The ink system should be capable of withstanding, without diminished performance, the temperature ranges to which the trap printed image will be exposed during lamination, sterilization, heat sealing (during pouch production), packaging (pouch filling), distribution, and the like.

In some embodiments, the surface of Film A and/or B to be printed can be treated by corona treatment or other suitable treatment (e.g. flame treatment) to prepare the surface for printing and lamination. The mating surface to which the printed surface will be adhered by lamination adhesive is also in one embodiment treated by corona treatment or other suitable treatment, e.g. flame treatment, to prepare the mating surface for printing and lamination. In some embodiments, only the film surfaces to be laminated together (i.e. layer 30 of Film A and layer 25 of Film B) are treated by corona treatment or other suitable treatment. In this embodiment, the film surfaces that will ultimately comprise the outside surfaces of the final laminate (i.e. layer 25 of Film A, and layer 30 of Film B) are not treated.

V.B. Packages

Figure 3:
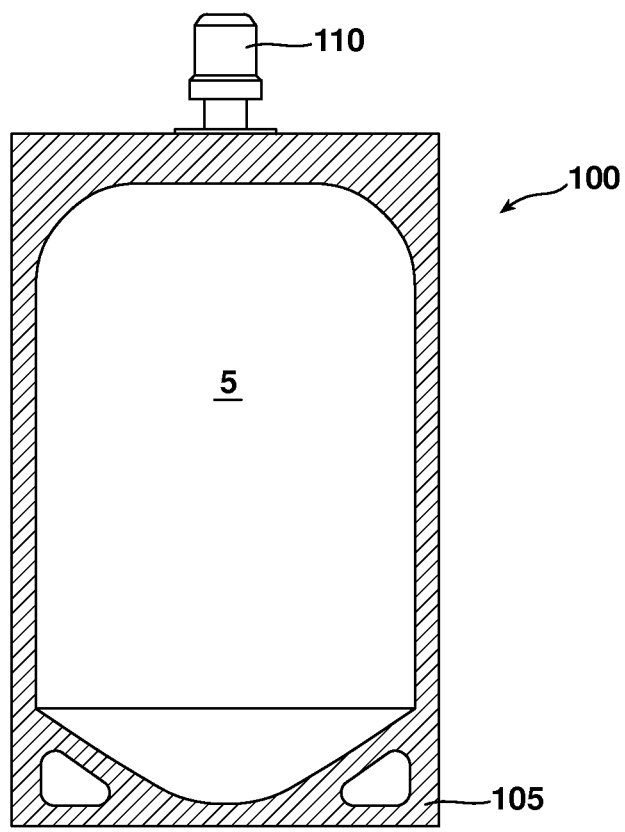
FIG. 3 is a front elevation view of a stand-up pouch that can be formed from the disclosed film or laminate in some embodiments.
Figure 4A:
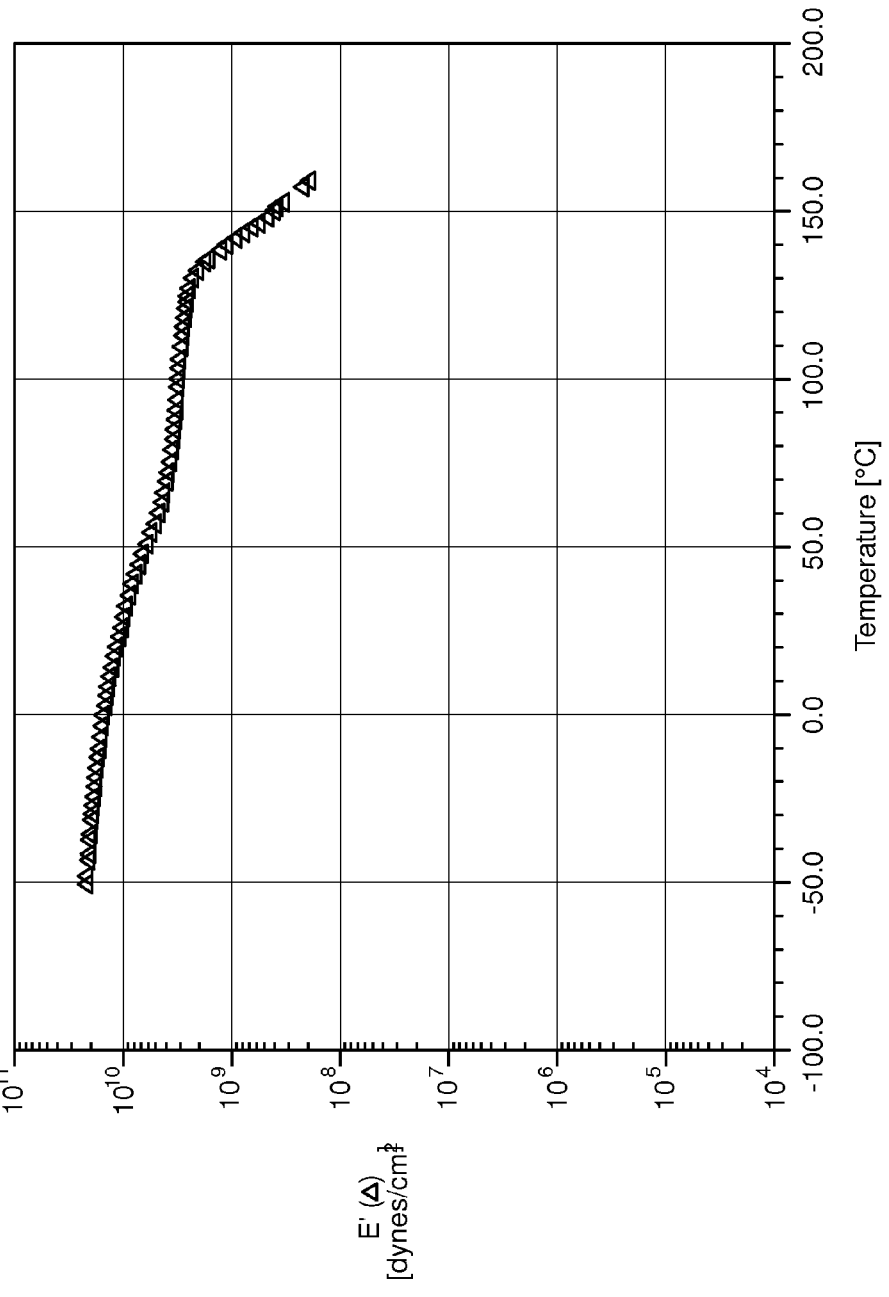
FIG. 4a is a graph of the storage modulus of Film 2a as a function of temperature.
Figure 4B:
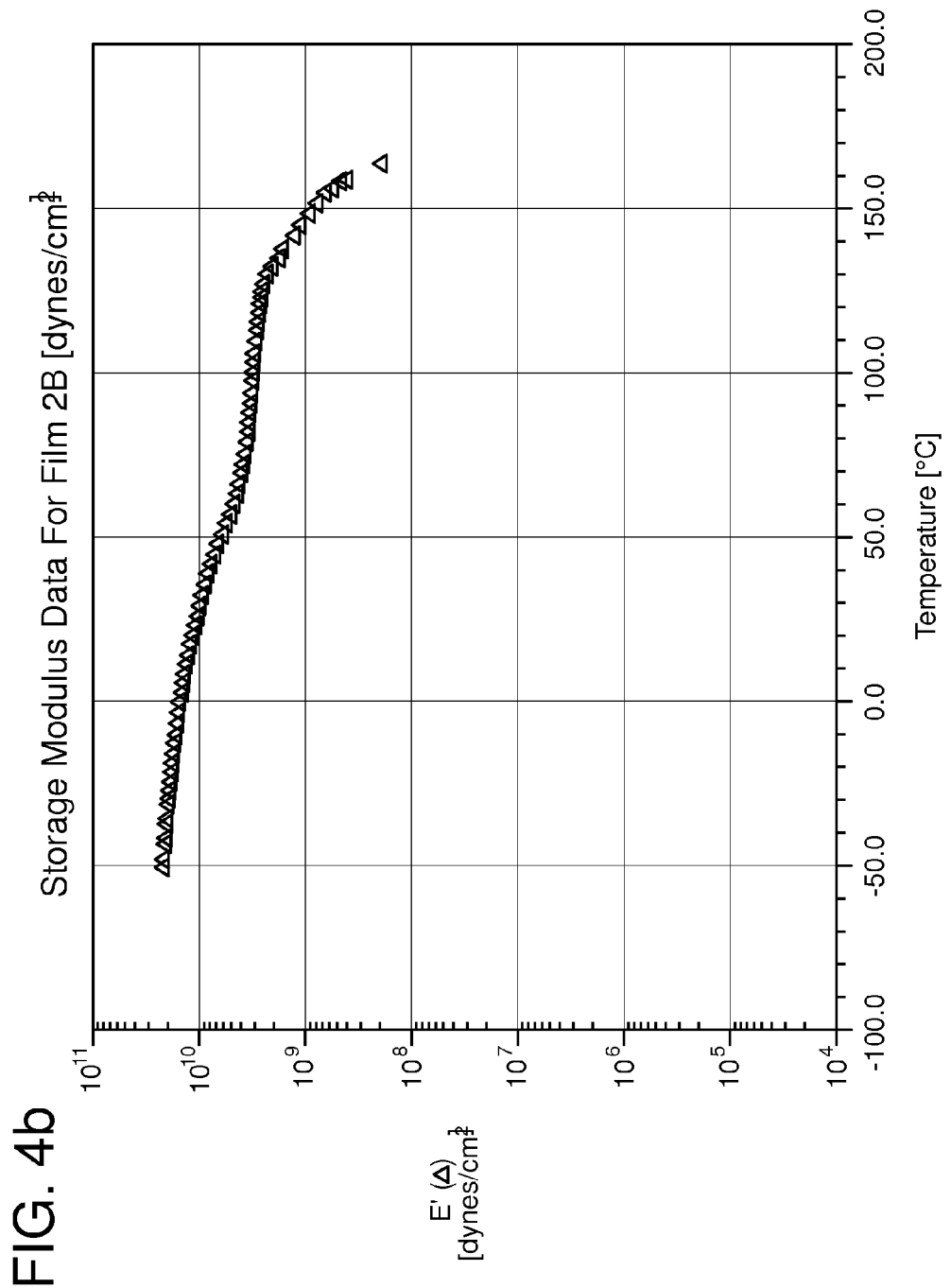
FIG. 4b is a graph of the storage modulus of Film 2b as a function of temperature.
Figure 4D:
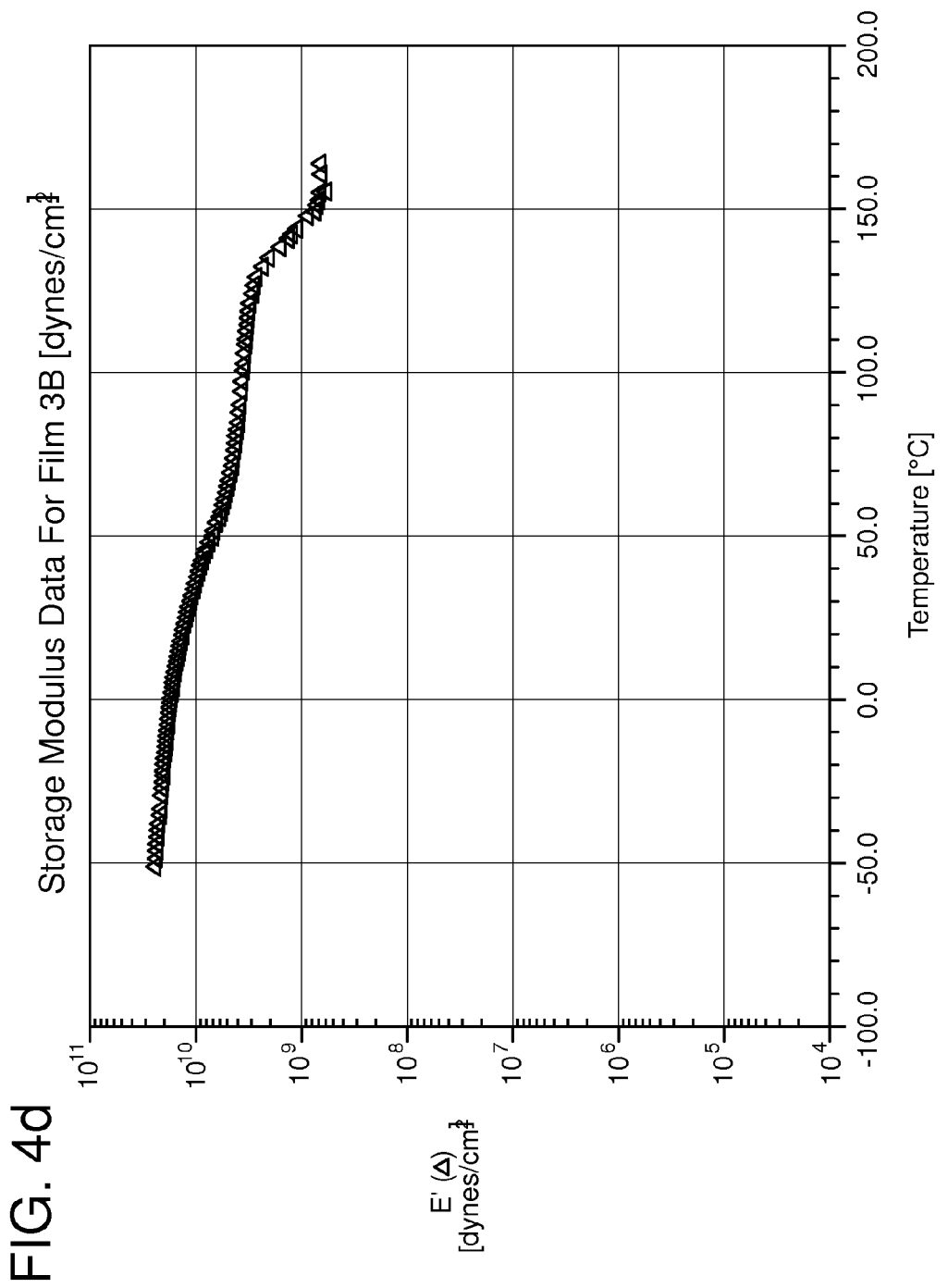
FIG. 4d is a graph of the storage modulus of Film 3b as a function of temperature.
Figure 4E:
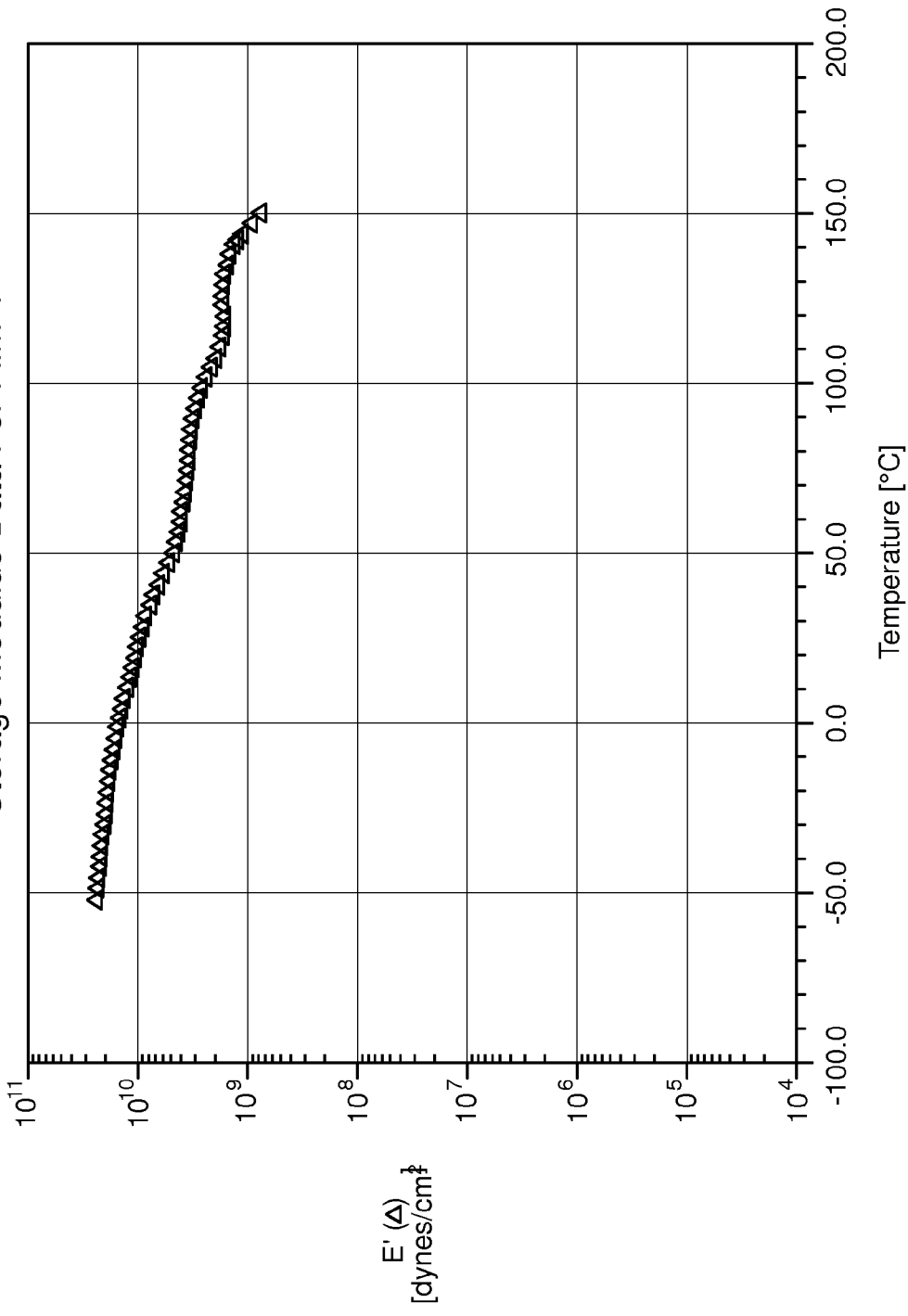
FIG. 4e is a graph of the storage modulus of Film 4 as a function of temperature.

Film 5 (and/or laminate 45) can be used to construct a wide variety of packages, including (but not limited to) stand-up pouches having a base for supporting the pouch in an upright position. To this end, FIG. 3 illustrates one embodiment of a stand-up pouch constructed from film 5 (and/or laminate 45). Particularly, stand-up pouch 100 comprises base 105 for supporting the pouch in an upright position and can optionally include fitment 100 for accessing the contents of the pouch. In addition, in some embodiments, pouch 100 can optionally comprise side gussets that include a typical center fold and lower triangular region formed by the folds of each side gusset, as would be known to those of ordinary skill in the art. See, for example, U.S. Pat. Nos. 6,857,779; 7,144,159; 6,997,858; U.S. Publication Nos. 2004/0161174; or 2004/0025476, the entire disclosures of which are herein incorporated by reference.

In some embodiments, the pouches constructed from the disclosed film and/or laminate can include or more fitments 110 attached thereto. Such methods can comprise the steps of: introducing a web of flexible film into an open film-sealing device for forming the peripheral seams defining at least one pouch; introducing at least one fitment tube, mounted on fitment tube sealing device between the layers of the web of flexible film within the open film sealing means; closing the film sealing device; forming the peripheral pouch seals and sealing the fitment tubes in the thus formed pouch using heat sealing; introducing said pouch to a cutting means and contouring the pouch; and removing the pouch from the web of flexible film. Heat sealing equipment is well known in the art. Thus, equipment suitable for use with the presently disclosed subject matter is any of such equipment well known in the art used in well known ways. Suitable fitments include those commonly used and well understood in the art. These can include, for example, fitments as disclosed in U.S. Pat. Nos. 5,026,352 and 4,324,423. The fitment shape can have a circular cross section, but any desirable cross sectional shape that allows for hermetic sealing of the fitment to the fitment tubes is suitable. It is to be appreciated that the fitments can be attached to the fitment tubes either before or after the fitment tubes are sealed to the flexible film pouches.

V.C. Sterilization

Aseptic packaging typically involves the sterilization of items (such as food products) outside of a package, and separate sterilization of the packaging material to produce a shelf stable package. Ultra high temperature can be used to rapidly heat the food product, followed by cooling of the product before the product is loaded into the pouch or other container formed from the packaging material. Processing times for the product can generally range from about 3 to about 15 seconds and temperatures can range from about 195° F. to about 285° F.

An example of a commercially available aseptic equipment system is the Pro-A2 machine produced by ProAseptic Technologies (Barcelona, Spain). Particularly, the machinery performs sterilizing, forming, filling, and sealing of the product. Essentially, film and/or laminate is unwound and sterilized using a hydrogen peroxide bath (30/35% solution at 50-60° C. with a film immersion time of 5 to 6 seconds). The film is then exposed to an air dryer unit (80 to 90° C.). The bottom gusset is next formed using a gusseting arm. The pouch bottom, sides, and top are then sealed. The pouches subsequently undergo a dye cut/cut out using a second film drive. After the pouches have been cut out, they are filled and closed. Specifically, the filling operation includes opening the top and bottom of the pouch, inflating with sterile air, and filling the pouch (a 2-step operation with a 50%/50% fill). The closing operation includes stretching closed the top of the pouch while flushing with nitrogen gas, optionally applying a fitment, sealing the top of the pouch and (optionally) the fitment, and using a vision system to reject pouches with fitments out of position. One of ordinary skill in the art would recognize that the disclosed film and/or laminate can be used on a wide variety of machines to produce a wide variety of packages. For example, the film can be used to produce pouches using a wide variety of HFFS, VFFS, and the like machinery.

VI. Advantages of the Presently Disclosed Subject Matter

The disclosed film (or laminate) can be sterilized and is also suitable for use in aseptic packaging applications without the undesirable film stretching and forming issues experienced with films currently used in the prior art.

In addition, when used to construct packages (such as stand-up pouches), the disclosed film (or laminate) tracks and seals better than similar prior art films. Further, the sealing temperatures for making the pouch and sealing the fitment to the film are lower than those used in prior art pouches.

The disclosed film (or laminate) can also be used to economically manufacture sterilizable packages, thereby allowing producers to offer product to end users with a significant price reduction compared to those pre-made pouches and systems that have been available in the past.

One of ordinary skill in the art would understand that the above list is not limiting and that the presently disclosed subject matter can include other advantages not included above.

EXAMPLES

The following Examples provide illustrative embodiments. In light of the present disclosure and the general level of skill in the art, those of ordinary skill in the art will appreciate that the following Examples are intended to be exemplary only and that numerous changes, modifications, and alterations can be employed without departing from the scope of the presently disclosed subject matter.

Several film structures in accordance with the presently disclosed subject matter and comparatives are identified herein below in Tables 1 and 2.

TABLE 1

| | Resin Identification | |
|---|---|---|
| Material Code | Trade Name or Designation | Source |
| A | 502835 | Ampacet (Tarrytown, New York, United States of America) |
| B | ENABLE ® 2005CH | ExxonMobile (Fairfax, Virginia, United States of America) |
| C | DOWLEX ® 2045.04 | Dow Chemical Company (Midland, Michigan, United States of America) |

TABLE 1-continued

Resin Identification

| Material Code | Trade Name or Designation | Source |
|---|---|---|
| D | PLEXAR ® PX3236 | LyondellBasell Industries (Rotterdam, Netherlands) |
| E | Exceed ® 1012CJ | ExxonMobile (Fairfax, Virginia, United States of America) |
| F | SOARNOL ® ET3803 | Nippon Gohsei (Tokyo, Japan) |
| G | Ultramid ® B40 LN01 | BASF Corporation (Florham Park, New Jersey, United States of America) |
| H | SOARNOL ® SGN017 | Nippon Gohsei (Tokyo, Japan) |
| I | Topas ® 5013X14 | Topas Advanced Polymers, Inc. (Florence, Kentucky, United States of America) |
| J | DMDA-8904 NT 7 | Dow Chemical Company (Midland, Michigan, United States of America) |
| K | Topas ® 8007 F-04 | Topas Advanced Polymers, Inc. (Florence, Kentucky, United States of America) |
| L | ELITE ® 5400G | Dow Chemical Company (Midland, Michigan, United States of America) |
| M | MXD S7007 | Mitsubishi Gas Chemical Company (Tokyo, Japan) |
| N | 662I | Dow Chemical Company (Midland, Michigan, United States of America) |
| O | PLEXAR ® PX3610X01 | LyondellBasell Industries (Rotterdam, Netherlands) |
| P | Eval ® L171B | EVALCA/Kuraray (Osaka, Japan) |
| Q | T50-200-178 | Ineos (Delaware City, Delaware, United States of America) |
| R | EXCEED 1012CA | ExxonMobile (Fairfax, Virginia, United States of America) |

A is an antiblock (sodium calcium aluminosilicate and talc in polyethylene) with a melt index of 4.80 g/10 minutes, bulk density of 37 lb/ft$^3$, and 19.6% ash.

B is an m-LDPE with density of 0.923 and flow rate of 0.50 g/g/10 min.

C is a linear low density ethylene/octene copolymer with a flow rate of 1.0 (+/−0.1) g/10 minutes and density of 0.92 (+/−0.002) g/cc (ASTM D1928, D1505).

D is a maleic anhydride-modified polyethylene tie layer with melt index of 2.0 g/10 minutes, density of 0.921 g/cc, vicat softening point of 100° C., and melting point of 125° C.

E is a metallocene very low density ethylene/hexene copolymer with density of 0.912 g/cc and melt flow rate of 1.0 g/10 minutes.

F is an ethylene/vinyl alcohol copolymer with density of 1.17 g/cc, 36.5-39.5 mole percent ethylene, melting point (DSC) of 173° C., and glass transition temperature (DSC) of 58° C.

G is a polyamide-6 with specific gravity of 1.14 and DSC melting point of 220° C. (+/−10° C.).

H is an ethylene/vinyl alcohol copolymer with less than 30 mol % ethylene.

I is a cyclic olefin copolymer with flow rate of 24 g/10 minutes, Tg of 134° C. (+/−4° C.), comonomer content of 76%, and density of 1.02 g/cc.

J is a polyethylene high density homopolymers.

K is an ethylene/norbornene copolymer with flow rate of 32 g/10 minutes, Tg of 78° C. (+/−4° C.), comonomer content of 36%, and density of 1.02 g/cc.

L is a metallocene linear low density ethylene/octene copolymer with flow rate of 1.1 g/10 minutes, density of 0.917 g/cc, and melting point of 123° C.

M is a MXD6/MXDI copolyamide.

N is a low density polyethylene with a flow rate (condition E) of 0.30-0.60 g/10 minutes, density of 0.919 g/cc (+/−0.001), melt point of 108° C., and vicat softening point of 93° C.

O is a tie layer of maleic anhydride-modified polyethylene with melt flow rate of 2.10 at 190° C./2.16 kg, density of 0.918 g/cc, and vicat softening point of 99° C.

P is an ethylene/vinyl alcohol copolymer with 27 mole % ethylene, flow rate of 3.9 g/10 minutes, density of 1.20 g/cc, and melting point (DSC) 191° C.

Q is a high density ethylene/butene copolymer with melt index of 2.0 g/10 minutes and density of 0.952 (+/−0.002) g/cc.

R is a metallocene very low density polyethylene with melt flow index of 0.8-1.2 g/10 minutes and density of 0.909-0.913 g/cc.

TABLE 2

Film Identification

| Film ID | Layer* | Formulation | Volume % | Mils | Microns |
|---|---|---|---|---|---|
| Film 1 | 1 | 70% C<br>22% N<br>8% A | 35.0 | 1.93 | 48.9 |
| | 2 | 100% O | 5.00 | 0.28 | 7.00 |
| | 3 | 100% G | 10.0 | 0.55 | 14.0 |
| | 4 | 100% P | 10.0 | 0.55 | 14.0 |
| | 5 | 100% G | 10.0 | 0.55 | 14.0 |
| | 6 | 100% O | 20.0 | 1.10 | 27.9 |
| | 7 | 60% K<br>20% L<br>15% Q<br>5% A | 10.0 | 0.55 | 14.0 |
| Film 2a | 1 | 70% C<br>22% B<br>8% A | 30.0 | 1.50 | 38.1 |
| | 2 | 80% D<br>20% E | 6.00 | 0.30 | 7.60 |
| | 3 | 100% F | 8.00 | 0.40 | 10.2 |
| | 4 | 100% G | 18.0 | 0.90 | 22.9 |
| | 5 | 100% M | 6.00 | 0.30 | 7.60 |
| | 6 | 80% D<br>20% E | 22.0 | 1.10 | 27.9 |
| | 7 | 80% I<br>16% J<br>4% A | 10.0 | 0.50 | 12.7 |
| Film 2b | 1 | 70% C<br>22% B<br>8% A | 30.0 | 1.20 | 30.5 |
| | 2 | 80% D<br>20% E | 6.00 | 0.24 | 6.10 |
| | 3 | 100% F | 8.00 | 0.32 | 8.20 |
| | 4 | 100% G | 18.0 | 0.72 | 18.3 |
| | 5 | 100% M | 6.00 | 0.24 | 6.10 |
| | 6 | 80% D<br>20% E | 22.0 | 0.88 | 22.4 |
| | 7 | 80% I<br>16% J<br>4% A | 10.0 | 0.40 | 10.2 |
| Film 3a | 1 | 70% C<br>22% B<br>8% A | 30.0 | 1.50 | 38.1 |
| | 2 | 80% D<br>20% E | 6.00 | 0.30 | 7.60 |
| | 3 | 100% H | 8.00 | 0.40 | 10.2 |
| | 4 | 100% G | 18.0 | 0.90 | 22.9 |
| | 5 | 100% M | 6.00 | 0.30 | 7.60 |

TABLE 2-continued

Film Identification

| Film ID | Layer* | Formulation | Volume % | Mils | Microns |
|---|---|---|---|---|---|
|  | 6 | 80% D<br>20% E | 22.0 | 1.10 | 27.9 |
|  | 7 | 80% I<br>16% J<br>4% A | 10.0 | 0.50 | 12.7 |
| Film 3b | 1 | 70% C<br>22% B<br>8% A | 30.0 | 1.20 | 30.5 |
|  | 2 | 80% D<br>20% E | 6.00 | 0.24 | 6.10 |
|  | 3 | 100% H | 8.00 | 0.32 | 8.20 |
|  | 4 | 100% G | 18.0 | 0.72 | 18.3 |
|  | 5 | 100% M | 6.00 | 0.24 | 6.10 |
|  | 6 | 80% D<br>20% E | 22.0 | 0.88 | 22.4 |
|  | 7 | 80% I<br>16% J<br>4% A | 10.0 | 0.40 | 10.2 |
| Film 4 | 1 | 70% C<br>22% B<br>8% A | 30.0 | 1.5 | 38.1 |
|  | 2 | 80% D<br>20% R | 6.0 | 0.3 | 7.6 |
|  | 3 | 100% H | 6.0 | 0.3 | 7.6 |
|  | 4 | 100% G | 20.0 | 1.0 | 25.4 |
|  | 5 | 100% M | 6.0 | 0.3 | 7.6 |
|  | 6 | 80% D<br>20% R | 22.0 | 1.10 | 27.9 |
|  | 7 | 60% I<br>36% J<br>4% A | 10.0 | 0.5 | 12.7 |
| Film 5 | 1 | 70% C<br>22% B<br>8% A | 30.0 | 1.5 | 38.1 |
|  | 2 | 80% D<br>20% R | 6.0 | 0.3 | 7.6 |
|  | 3 | 100% F | 6.0 | 0.3 | 7.6 |
|  | 4 | 100% G | 20.0 | 1.0 | 25.4 |
|  | 5 | 100% M | 6.0 | 0.3 | 7.6 |
|  | 6 | 80% D<br>20% R | 22.0 | 1.10 | 27.9 |
|  | 7 | 60% I<br>36% J<br>4% A | 10.0 | 0.5 | 12.7 |
| Film 6 | 1 | 70% C<br>22% B<br>8% A | 30.0 | 1.5 | 38.1 |
|  | 2 | 80% D<br>20% R | 6.0 | 0.3 | 7.6 |
|  | 3 | 100% M | 6.0 | 0.3 | 7.6 |
|  | 4 | 100% G | 20.0 | 1.0 | 25.4 |
|  | 5 | 100% H | 6.0 | 0.3 | 7.6 |
|  | 6 | 80% D<br>20% R | 22.0 | 1.10 | 27.9 |
|  | 7 | 60% I<br>36% J<br>4% A | 10.0 | 0.5 | 12.7 |
| Film 7 | 1 | 70% C<br>22% B<br>8% A | 30.0 | 1.5 | 38.1 |
|  | 2 | 80% D<br>20% R | 6.0 | 0.3 | 7.6 |
|  | 3 | 100% M | 6.0 | 0.3 | 7.6 |
|  | 4 | 100% G | 20.0 | 1.0 | 25.4 |
|  | 5 | 100% F | 6.0 | 0.3 | 7.6 |
|  | 6 | 80% D<br>20% R | 22.0 | 1.10 | 27.9 |
|  | 7 | 60% I<br>36% J<br>4% A | 10.0 | 0.5 | 12.7 |

*Layer 1 of the Films of Table 2 functions as a sealant layer, or food contact layer, typically the layer closest to the article to be packaged; Layer 7 functions as a skin or outer layer, typically the layer farthest from the article to be packaged.

Example 1

Manufacture of Package 1

Film 1 (140μ), with the composition and construction shown in Table 2, was formed by coextrusion. Film 1 was loaded onto a ProAseptic Pro-A2 HFFS packaging machine (available from ProAseptic Technologies of Barcelona, Spain). The machinery sterilized the film using hydrogen peroxide as the chemical sterilant. Specifically, the film was immersed for about 5.5 seconds in a bath of 35% hydrogen peroxide solution at 55° C.

The film was then formed into a series of stand-up pouches containing fitments sealed to the film (referred to as "Package 1"). Specifically, the machinery included a gusseting arm that produced a bottom gusset for the reel width. Pressure was then applied. The bottom, sides, and top of each pouch was then sealed. Each pouch was then dye cut/cut out with a second film drive. Each pouch was next filled with water by opening the top of the pouch, inflating the pouch with sterile air, and filling the pouch using a 2-step operation with a 50%/50% fill. Each pouch was then closed by stretching closed the top of the pouch while gas flushing with nitrogen. A fitment was then applied and the top of the pouch and fitment were sealed. A vision system was used to reject pouches with fitments improperly positioned.

Example 2

Manufacture of Packages 2-7

Films 2a (127μ) and 2b (100μ) with the composition and construction shown in Table 2 were formed by coextrusion and loaded onto the ProAseptic Pro-A2 packaging machine to produce Packages 2 and 3, respectively, as set forth in Example 1.

Films 3a (127μ) and 3b (100μ) with the composition and construction shown in Table 2 were formed by coextrusion and loaded onto the ProAseptic Pro-A2 packaging machine to produce Packages 4 and 5, respectively, as set forth in Example 1.

Film 4 (127μ) with the composition and construction shown in Table 2 was formed by coextrusion and loaded onto the ProAseptic Pro-A2 packaging machine to produce Package 6, as set forth in Example 1.

Film 5 (127μ) with the composition and construction shown in Table 2 was formed by coextrusion and loaded onto the ProAseptic Pro-A2 packaging machine to produce Package 7, as set forth in Example 1.

A summary of the construction of Packages 1-7 is provided below in Table 3.

TABLE 3

Package 1-7 Construction Summary

| Film | Corresponding Package |
|---|---|
| 1 | 1 |
| 2a | 2 |
| 2b | 3 |
| 3a | 4 |
| 3b | 5 |
| 4 | 6* |
| 5 | 7* |
| 6 | 8* |
| 7 | 9* |

*The construction of Packages 6-9 are prophetic. Packages 1-5 were made.

Example 3

Manufacture of Packages 8-9

Laminates in accordance with the presently disclosed subject matter were constructed from the films of Table 2 by otherwise conventional printing and lamination techniques to produce the laminates shown in Table 4.

TABLE 4

Laminate Construction Summary

| Laminate | Composition of Film A | Trap Print Image | Composition of Film B | Total Laminate Thickness** |
|---|---|---|---|---|
| 1 | Film 4 (63µ) | Trap Print Image | Film 4 (38µ) | 101µ |
| 2 | Film 5 (63µ) | Trap Print Image | Film 5 (38µ) | 101µ |
| 3* | Film 6 (63µ) | Trap Print Image | Film 4 (38µ) | 101µ |
| 4* | Film 7 (63µ) | Trap Print Image | Film 5 (38µ) | 101µ |

*The construction of Laminates 3 and 4 are prophetic. Laminates 1 and 2 were made.
**The total thickness of each laminate of Table 4 ignores the thickness of the adhesive bonding Films A and B together. A typical thickness is about 2.5 micrometers.

Thus, Laminates 1-4 have the following structure: Film A/Printed Image/Adhesive/Film B. For example, Laminate 1 has the structure: (Film 4 Layers) 1/2/3/4/5/6/7/Printed Image/Adhesive/(Film 4 Layers) 1/2/3/4/5/6/7. The laminates include a printed image between the first and second films (Films A and B), and also includes an adhesive that bonds the first and second films together. As shown the image can be considered to be reverse printed onto the inside surface of Film A, i.e., the layer shown adjacent to the printed image (layer 7 of Film A in Laminate 1, for example).

In an alternate embodiment of the invention, the image can be printed on the innermost layer of Film B (layer 1 of Film B, for example). This embodiment can be illustrated as: (Film 4 layers) 1/2/3/4/5/6/7/Adhesive/Printed Image/(Film 4 layers) 1/2/3/4/5/6/7. Thus, the innermost layer of Film B can provide the surface upon which a printed image is applied, in which case the innermost layer of Film B provides a surface that is compatible with the selected print ink system. Further, the innermost layer of Film B provides the inside surface to which Film A can be directly laminated.

Thus, a printed image can be disposed (i.e., "trap printed") on Film A or B at the interface between the outside surface of Film A and the inside surface of Film B. This can be accomplished by printing one or more images on one or both of these surfaces before laminating the images together with adhesive, so that upon lamination the printed image is trapped between the two films. In some embodiments, the image can be "reverse trap printed" by printing the image onto the inside surface of Film B.

The process for making the printed sterilizable laminates of Table 4 includes making Film A, making Film B, applying a lamination adhesive such as polyurethane to the outside surface of Film A, reverse printing the inside surface of Film B with the desired printed image, and bringing Films A and B together in a conventional lamination step to create the final sterilizable laminate. The exact sequence of steps can be varied from that described herein, provided the resulting laminate is trap printed as described.

Laminate 1 with the composition and construction shown in Table 4 loaded onto the ProAseptic Pro-A2 packaging machine to produce Package 10, as set forth in Example 1.

Laminate 2 with the composition and construction shown in Table 4 loaded onto the ProAseptic Pro-A2 packaging machine to produce Package 11, as set forth in Example 1.

Laminate 3 with the composition and construction shown in Table 4 loaded onto the ProAseptic Pro-A2 packaging machine to produce Package 12, as set forth in Example 1.

Laminate 4 with the composition and construction shown in Table 4 loaded onto the ProAseptic Pro-A2 packaging machine to produce Package 13, as set forth in Example 1.

A summary of the construction of Packages 10-13 is provided below in Table 5.

TABLE 5

Package 8-10 Summary

| Laminate | Corresponding Package |
|---|---|
| 1 | 10 |
| 2 | 11 |
| 3* | 12 |
| 4* | 13 |

*The construction of Packages 12 and 13 are prophetic. Packages 10 and 11 were made.

Example 4

Package Observations

It was observed that Package 1 exhibited gusset self-welding and film stretching. As a result, the packages were unable to be opened to determine if the film can convert to a stand-up pouch. In addition, the fitment seal quality appearance was not as good as the standard.

Packages 2-5 and 10-11 exhibited none of the gusset self-welding and film stretching issues noticed with Package 1. In addition, the dimensional stability of Packages 2-5 and 10-11 was very good.

Example 5

Storage Modulus Testing

The storage modulus of Films 2a, 2b, 3a, 3b, 4, and 5 was determined at temperatures of from −50° C. to 150° C. Specifically, a 6 mm×30 mm sample of each film was mounted on a Rheometrics RSA-II Solids Analyzer (available from Rheometrics, Inc. of Piscataway, N.J., United States of America) using a fiber/film fixture. The nominal jaw separation for the fixture following sample mounting was about 22.90 mm. Film sample thickness was measured using a Nikon ME-50HA (available from Nikon Instruments, Inc., Melville, N.Y., United States of America) digital micrometer possessing an accuracy of +/−1%.

Dynamic mechanical spectra were obtained and reported by the procedures outlined in ASTM D-4065-89 and ASTM D-5026-90. The temperature of the sample was steeped from −50° C. to 150° C. at 5° C. increments while allowing for a one-minute delay to ensure sample thermal equilibrium at each temperature step. The maximum strain amplitude was set at 0.1%, and static-force-tracking-dynamic-force mode for autotension was used to prevent sample buckling during testing.

An initial pretension was imposed on the sample and the static force was set to exceed the dynamic force by 140% as the test advanced to higher temperatures. The initial pretension value was set based on sample dimension and the required strain level to achieve a target stress value $1 \times 10^8$ dynes/cm$^2$. The entire experiment was performed at constant angular frequency (isochronal temperature sweep) of 22 rad/sec. Duplicate runs were made and a two-point smoothing of the combined spectra was used to generate the final spectrum.

Storage modulus data for Films 2a, 2b, 3a, 3b, 4 and 5 is given below in Tables 4, 5, 6, 7, 8, and 9 and in FIGS. 4a-4f. A plot of the storage modulus as a function of temperature (° C.) is shown in FIGS. 4a-4f.

TABLE 6

Storage Modulus Data for Film 2a

| Temp. (° C.) | dynes/cm$^2$ |
|---|---|
| −50.54 | 2.2009 × 10$^{10}$ |
| −50.37 | 2.2088 × 10$^{10}$ |
| −48.14 | 2.1954 × 10$^{10}$ |
| −48.13 | 2.1959 × 10$^{10}$ |
| −43.77 | 2.1788 × 10$^{10}$ |
| −43.45 | 2.1629 × 10$^{10}$ |
| −42.09 | 2.1469 × 10$^{10}$ |
| −42.02 | 2.1541 × 10$^{10}$ |
| −37.43 | 2.1033 × 10$^{10}$ |
| −37.29 | 2.0986 × 10$^{10}$ |
| −35.99 | 2.0761 × 10$^{10}$ |
| −35.89 | 2.0754 × 10$^{10}$ |
| −31.67 | 2.0129 × 10$^{10}$ |
| −31.21 | 2.0082 × 10$^{10}$ |
| −30.07 | 1.9875 × 10$^{10}$ |
| −30.03 | 1.9858 × 10$^{10}$ |
| −27.39 | 1.9395 × 10$^{10}$ |
| −25.47 | 1.9142 × 10$^{10}$ |
| −24.18 | 1.8943 × 10$^{10}$ |
| −22.38 | 1.8664 × 10$^{10}$ |
| −20.90 | 2.8417 × 10$^{10}$ |
| −19.28 | 1.8185 × 10$^{10}$ |
| −18.20 | 1.7985 × 10$^{10}$ |
| −16.39 | 1.7740 × 10$^{10}$ |
| −14.84 | 1.750+ × 10$^{10}$ |
| −13.10 | 1.7294 × 10$^{10}$ |
| −12.02 | 1.7115 × 10$^{10}$ |
| −10.48 | 1.6884 × 10$^{10}$ |
| −8.93 | 1.6665 × 10$^{10}$ |
| −6.82 | 1.6432 × 10$^{10}$ |
| −5.80 | 1.6280 × 10$^{10}$ |
| −3.91 | 1.6028 × 10$^{10}$ |
| −2.93 | 1.5869 × 10$^{10}$ |
| −0.42 | 1.5576 × 10$^{10}$ |
| 0.48 | 1.5430 × 10$^{10}$ |
| 2.33 | 1.5160 × 10$^{10}$ |
| 3.30 | 1.4990 × 10$^{10}$ |
| 5.30 | 1.4671 × 10$^{10}$ |
| 6.26 | 1.4487 × 10$^{10}$ |
| 8.24 | 1.1418 × 10$^{10}$ |
| 9.22 | 1.3978 × 10$^{10}$ |
| 11.23 | 1.3627 × 10$^{10}$ |
| 12.02 | 1.3419 × 10$^{10}$ |
| 14.01 | 1.3004 × 10$^{10}$ |
| 14.91 | 1.2839 × 10$^{10}$ |
| 17.42 | 1.2448 × 10$^{10}$ |
| 17.99 | 1.2318 × 10$^{10}$ |
| 20.10 | 1.1887 × 10$^{10}$ |
| 20.81 | 1.1699 × 10$^{10}$ |
| 23.34 | 1.1310 × 10$^{10}$ |
| 24.24 | 1.1130 × 10$^{10}$ |
| 26.05 | 1.0800 × 10$^{10}$ |
| 26.75 | 1.0644 × 10$^{10}$ |
| 29.18 | 1.0210 × 10$^{10}$ |
| 30.03 | 1.0000 × 10$^{10}$ |
| 32.41 | 9.5700 × 10$^9$ |
| 32.99 | 9.4916 × 10$^9$ |
| 35.67 | 9.0447 × 10$^9$ |
| 36.11 | 8.981 × 10$^9$ |
| 38.45 | 8.4387 × 10$^9$ |
| 39.13 | 8.3468 × 10$^9$ |
| 41.71 | 8.0032 × 10$^9$ |
| 42.46 | 7.8065 × 10$^9$ |
| 44.84 | 7.3233 × 10$^9$ |

TABLE 6-continued

Storage Modulus Data for Film 2a

| Temp. (° C.) | dynes/cm$^2$ |
|---|---|
| 45.34 | 7.2509 × 10$^9$ |
| 48.08 | 6.8731 × 10$^9$ |
| 48.56 | 6.7125 × 10$^9$ |
| 50.90 | 6.1990 × 10$^9$ |
| 51.54 | 6.1250 × 10$^9$ |
| 54.46 | 5.7358 × 10$^9$ |
| 54.51 | 5.7105 × 10$^9$ |
| 56.90 | 5.1911 × 10$^9$ |
| 57.41 | 5.1060 × 10$^9$ |
| 60.19 | 4.8815 × 10$^9$ |
| 60.40 | 4.8749 × 10$^9$ |
| 63.27 | 4.5095 × 10$^9$ |
| 63.78 | 4.4342 × 10$^9$ |
| 66.07 | 4.3283 × 10$^9$ |
| 66.97 | 4.2878 × 10$^9$ |
| 69.13 | 4.1040 × 10$^9$ |
| 70.05 | 4.0580 × 10$^9$ |
| 71.96 | 4.0089 × 10$^9$ |
| 72.80 | 3.9915 × 10$^9$ |
| 75.22 | 3.8362 × 10$^9$ |
| 75.76 | 3.8034 × 10$^9$ |
| 78.70 | 3.7348 × 10$^9$ |
| 79.45 | 3.7323 × 10$^9$ |
| 81.64 | 3.6129 × 10$^9$ |
| 82.53 | 3.5771 × 10$^9$ |
| 84.88 | 3.5154 × 10$^9$ |
| 85.27 | 3.5287 × 10$^9$ |
| 87.72 | 3.4398 × 10$^9$ |
| 88.48 | 3.4212 × 10$^9$ |
| 91.07 | 3.3686 × 10$^9$ |
| 91.23 | 3.3785 × 10$^9$ |
| 93.71 | 3.3073 × 10$^9$ |
| 94.39 | 3.2969 × 10$^9$ |
| 97.56 | 3.2542 × 10$^9$ |
| 98.39 | 3.2520 × 10$^9$ |
| 99.79 | 3.2049 × 10$^9$ |
| 100.67 | 3.1922 × 10$^9$ |
| 103.17 | 3.1537 × 10$^9$ |
| 103.79 | 3.1575 × 10$^9$ |
| 105.95 | 3.0973 × 10$^9$ |
| 106.45 | 3.0879 × 10$^9$ |
| 109.43 | 3.0097 × 10$^9$ |
| 110.21 | 2.9978 × 10$^9$ |
| 112.48 | 2.9286 × 10$^9$ |
| 113.45 | 2.9211 × 10$^9$ |
| 115.03 | 2.8732 × 10$^9$ |
| 115.83 | 2.8731 × 10$^9$ |
| 117.91 | 2.8178 × 10$^9$ |
| 120.71 | 2.7381 × 10$^9$ |
| 121.53 | 2.7267 × 10$^9$ |
| 123.25 | 2.7107 × 10$^9$ |
| 124.18 | 2.6756 × 10$^9$ |
| 126.24 | 2.6184 × 10$^9$ |
| 126.96 | 2.5677 × 10$^9$ |
| 129.65 | 2.4153 × 10$^9$ |
| 129.98 | 2.3746 × 10$^9$ |
| 131.93 | 2.1776 × 10$^9$ |
| 132.57 | 2.1287 × 10$^9$ |
| 134.85 | 1.8595 × 10$^9$ |
| 135.80 | 1.7110 × 10$^9$ |
| 138.24 | 1.3561 × 10$^9$ |
| 138.57 | 1.3381 × 10$^9$ |
| 140.16 | 1.1675 × 10$^9$ |
| 142.34 | 9.4625 × 10$^8$ |
| 143.91 | 8.1056 × 10$^8$ |
| 145.38 | 6.8718 × 10$^8$ |
| 146.62 | 6.0266 × 10$^8$ |
| 148.39 | 5.0192 × 10$^8$ |
| 150.05 | 4.4303 × 10$^8$ |
| 151.23 | 4.0858 × 10$^8$ |
| 152.62 | 3.6185 × 10$^8$ |
| 152.87 | 3.4685 × 10$^8$ |
| 157.49 | 2.3370 × 10$^8$ |
| 159.25 | 2.0329 × 10$^8$ |

TABLE 7

Storage Modulus Data for Film 2b

| Temp. (° C.) | dynes/cm$^2$ |
| --- | --- |
| −50.35 | $2.2871 \times 10^{10}$ |
| −50.05 | $2.2833 \times 10^{10}$ |
| −48.04 | $2.2521 \times 10^{10}$ |
| −47.90 | $2.2465 \times 10^{10}$ |
| −45.05 | $2.2071 \times 10^{10}$ |
| −45.05 | $2.2119 \times 10^{10}$ |
| −40.45 | $2.1637 \times 10^{10}$ |
| −40.30 | $2.1509 \times 10^{10}$ |
| −39.00 | $2.1392 \times 10^{10}$ |
| −38.88 | $2.1249 \times 10^{10}$ |
| −34.54 | $2.0774 \times 10^{10}$ |
| −34.38 | $2.0756 \times 10^{10}$ |
| −32.99 | $2.0591 \times 10^{10}$ |
| −32.91 | $2.0577 \times 10^{10}$ |
| −28.34 | $1.9895 \times 10^{10}$ |
| −28.20 | $1.9756 \times 10^{10}$ |
| −26.91 | $1.9663 \times 10^{10}$ |
| −26.88 | $1.9652 \times 10^{10}$ |
| −24.10 | $1.9208 \times 10^{10}$ |
| −22.14 | $1.8863 \times 10^{10}$ |
| −20.80 | $1.8746 \times 10^{10}$ |
| −19.35 | $1.8566 \times 10^{10}$ |
| −18.05 | $1.8361 \times 10^{10}$ |
| −15.98 | $1.7978 \times 10^{10}$ |
| −14.86 | $1.7847 \times 10^{10}$ |
| −13.08 | $1.7730 \times 10^{10}$ |
| −11.90 | $1.7553 \times 10^{10}$ |
| −9.99 | $1.7224 \times 10^{10}$ |
| −8.88 | $1.7080 \times 10^{10}$ |
| −6.68 | $1.6914 \times 10^{10}$ |
| −5.51 | $1.6725 \times 10^{10}$ |
| −3.55 | $1.6362 \times 10^{10}$ |
| −2.55 | $1.6224 \times 10^{10}$ |
| −0.30 | $1.6031 \times 10^{10}$ |
| 0.45 | $1.5879 \times 10^{10}$ |
| 2.34 | $1.5479 \times 10^{10}$ |
| 3.43 | $1.5280 \times 10^{10}$ |
| 5.35 | $1.5078 \times 10^{10}$ |
| 6.29 | $1.4882 \times 10^{10}$ |
| 8.20 | $1.4417 \times 10^{10}$ |
| 9.12 | $1.4246 \times 10^{10}$ |
| 11.09 | $1.4015 \times 10^{10}$ |
| 12.05 | $1.3826 \times 10^{10}$ |
| 14.20 | $1.3331 \times 10^{10}$ |
| 15.01 | $1.3156 \times 10^{10}$ |
| 17.44 | $1.2860 \times 10^{10}$ |
| 18.39 | $1.2698 \times 10^{10}$ |
| 20.38 | $1.2276 \times 10^{10}$ |
| 21.29 | $1.2103 \times 10^{10}$ |
| 23.43 | $1.1834 \times 10^{10}$ |
| 24.15 | $1.1711 \times 10^{10}$ |
| 26.63 | $1.1225 \times 10^{10}$ |
| 27.38 | $1.1102 \times 10^{10}$ |
| 29.30 | $1.0858 \times 10^{10}$ |
| 30.34 | $1.0678 \times 10^{10}$ |
| 32.49 | $1.0213 \times 10^{10}$ |
| 33.06 | $1.0115 \times 10^{10}$ |
| 35.57 | $9.8036 \times 10^{9}$ |
| 36.44 | $9.6660 \times 10^{9}$ |
| 38.67 | $9.2091 \times 10^{9}$ |
| 39.41 | $9.0609 \times 10^{9}$ |
| 41.89 | $8.7175 \times 10^{9}$ |
| 42.40 | $8.6220 \times 10^{9}$ |
| 44.93 | $8.0672 \times 10^{9}$ |
| 45.39 | $7.9585 \times 10^{9}$ |
| 48.18 | $7.4276 \times 10^{9}$ |
| 48.77 | $7.3302 \times 10^{9}$ |
| 51.11 | $6.7498 \times 10^{9}$ |
| 51.85 | $6.5886 \times 10^{9}$ |
| 54.00 | $6.1351 \times 10^{9}$ |
| 54.81 | $6.0345 \times 10^{9}$ |
| 57.40 | $5.5012 \times 10^{9}$ |
| 58.04 | $5.4270 \times 10^{9}$ |
| 60.12 | $5.1192 \times 10^{9}$ |
| 60.46 | $5.0776 \times 10^{9}$ |
| 63.18 | $4.7902 \times 10^{9}$ |
| 63.83 | $4.7349 \times 10^{9}$ |
| 66.31 | $4.5520 \times 10^{9}$ |
| 67.42 | $4.4908 \times 10^{9}$ |
| 69.30 | $4.3673 \times 10^{9}$ |
| 69.93 | $4.3393 \times 10^{9}$ |
| 72.55 | $4.2236 \times 10^{9}$ |
| 73.45 | $4.2147 \times 10^{9}$ |
| 75.66 | $4.1137 \times 10^{9}$ |
| 76.01 | $4.1035 \times 10^{9}$ |
| 78.78 | $4.0115 \times 10^{9}$ |
| 79.16 | $4.0139 \times 10^{9}$ |
| 81.53 | $3.9263 \times 10^{9}$ |
| 82.14 | $3.9136 \times 10^{9}$ |
| 84.64 | $3.8324 \times 10^{9}$ |
| 85.52 | $3.8222 \times 10^{9}$ |
| 88.05 | $3.7378 \times 10^{9}$ |
| 88.82 | $3.7258 \times 10^{9}$ |
| 90.67 | $3.6612 \times 10^{9}$ |
| 91.67 | $3.6475 \times 10^{9}$ |
| 94.06 | $3.5684 \times 10^{9}$ |
| 94.95 | $3.5546 \times 10^{9}$ |
| 97.30 | $3.4752 \times 10^{9}$ |
| 97.94 | $3.4680 \times 10^{9}$ |
| 99.95 | $3.3953 \times 10^{9}$ |
| 101.04 | $3.3747 \times 10^{9}$ |
| 103.00 | $3.3047 \times 10^{9}$ |
| 103.70 | $3.2966 \times 10^{9}$ |
| 106.25 | $3.2012 \times 10^{9}$ |
| 106.77 | $3.1905 \times 10^{9}$ |
| 109.49 | $3.0945 \times 10^{9}$ |
| 109.91 | $3.0899 \times 10^{9}$ |
| 112.45 | $2.9862 \times 10^{9}$ |
| 113.14 | $2.9601 \times 10^{9}$ |
| 115.25 | $2.8748 \times 10^{9}$ |
| 116.37 | $2.8682 \times 10^{9}$ |
| 117.92 | $2.8204 \times 10^{9}$ |
| 120.98 | $2.7029 \times 10^{9}$ |
| 121.14 | $2.6892 \times 10^{9}$ |
| 123.90 | $2.6022 \times 10^{9}$ |
| 123.98 | $2.6266 \times 10^{9}$ |
| 126.86 | $2.5717 \times 10^{9}$ |
| 127.08 | $2.5069 \times 10^{9}$ |
| 128.48 | $2.4058 \times 10^{9}$ |
| 128.87 | $2.4131 \times 10^{9}$ |
| 132.17 | $2.1971 \times 10^{9}$ |
| 132.29 | $2.1578 \times 10^{9}$ |
| 134.96 | $1.9083 \times 10^{9}$ |
| 135.18 | $1.8952 \times 10^{9}$ |
| 138.37 | $1.5843 \times 10^{9}$ |
| 138.52 | $1.6083 \times 10^{9}$ |
| 142.18 | $1.2713 \times 10^{9}$ |
| 142.18 | $1.2770 \times 10^{9}$ |
| 145.15 | $1.0960 \times 10^{9}$ |
| 145.46 | $1.0774 \times 10^{9}$ |
| 148.79 | $9.2158 \times 10^{8}$ |
| 148.94 | $9.1770 \times 10^{8}$ |
| 151.97 | $7.8901 \times 10^{8}$ |
| 152.10 | $7.8751 \times 10^{8}$ |
| 154.93 | $6.3828 \times 10^{8}$ |
| 155.17 | $6.2918 \times 10^{8}$ |
| 156.41 | $5.7713 \times 10^{8}$ |
| 158.545 | $4.4052 \times 10^{8}$ |
| 159.04 | $4.0488 \times 10^{8}$ |
| 159.41 | $4.0499 \times 10^{8}$ |
| 163.96 | $1.8604 \times 10^{8}$ |

TABLE 8

Storage Modulus Data for Film 3a

| Temp. (° C.) | dynes/cm² |
|---|---|
| −50.43 | $2.2408 \times 10^{10}$ |
| −50.25 | $2.2321 \times 10^{10}$ |
| −48.20 | $2.1938 \times 10^{10}$ |
| −47.98 | $2.1914 \times 10^{10}$ |
| −43.84 | $2.1611 \times 10^{10}$ |
| −43.77 | $2.1408 \times 10^{10}$ |
| −41.96 | $2.1222 \times 10^{10}$ |
| −41.89 | $2.1037 \times 10^{10}$ |
| −38.77 | $2.0700 \times 10^{10}$ |
| −37.76 | $2.0719 \times 10^{10}$ |
| −36.03 | $2.0559 \times 10^{10}$ |
| −34.43 | $1.9990 \times 10^{10}$ |
| −33.17 | $1.9926 \times 10^{10}$ |
| −32.81 | $1.9647 \times 10^{10}$ |
| −28.83 | $1.9309 \times 10^{10}$ |
| −28.23 | $1.9059 \times 10^{10}$ |
| −27.23 | $1.8999 \times 10^{10}$ |
| −26.98 | $1.8735 \times 10^{10}$ |
| −22.73 | $1.8196 \times 10^{10}$ |
| −22.30 | $1.8081 \times 10^{10}$ |
| −21.08 | $1.8132 \times 10^{10}$ |
| −20.94 | $1.7780 \times 10^{10}$ |
| −16.39 | $1.7275 \times 10^{10}$ |
| −15.98 | $1.6938 \times 10^{10}$ |
| −14.95 | $1.7011 \times 10^{10}$ |
| −14.88 | $1.1706 \times 10^{10}$ |
| −10.19 | $1.6515 \times 10^{10}$ |
| −9.95 | $1.6123 \times 10^{10}$ |
| −8.98 | $1.6154 \times 10^{10}$ |
| −8.77 | $1.5871 \times 10^{10}$ |
| −4.13 | $1.5522 \times 10^{10}$ |
| −3.66 | $1.5301 \times 10^{10}$ |
| −2.64 | $1.5268 \times 10^{10}$ |
| −2.61 | $1.5036 \times 10^{10}$ |
| 2.07 | $1.4485 \times 10^{10}$ |
| 2.49 | $1.4309 \times 10^{10}$ |
| 3.35 | $1.4382 \times 10^{10}$ |
| 3.51 | $1.4098 \times 10^{10}$ |
| 8.27 | $1.3412 \times 10^{10}$ |
| 8.36 | $1.3133 \times 10^{10}$ |
| 9.12 | $1.3219 \times 10^{10}$ |
| 9.23 | $1.3298 \times 10^{10}$ |
| 14.23 | $1.2402 \times 10^{10}$ |
| 14.32 | $1.2078 \times 10^{10}$ |
| 15.05 | $1.2095 \times 10^{10}$ |
| 15.26 | $1.1862 \times 10^{10}$ |
| 19.82 | $1.1219 \times 10^{10}$ |
| 20.45 | $1.1135 \times 10^{10}$ |
| 21.04 | $1.1078 \times 10^{10}$ |
| 21.34 | $1.0808 \times 10^{10}$ |
| 26.03 | $1.0155 \times 10^{10}$ |
| 26.25 | $9.8542 \times 10^{9}$ |
| 27.11 | $9.8297 \times 10^{9}$ |
| 27.14 | $9.9278 \times 10^{9}$ |
| 32.18 | $8.9996 \times 10^{9}$ |
| 32.39 | $8.7529 \times 10^{9}$ |
| 33.16 | $8.6760 \times 10^{9}$ |
| 33.30 | $8.5434 \times 10^{9}$ |
| 38.35 | $7.7400 \times 10^{9}$ |
| 38.48 | $7.7189 \times 10^{9}$ |
| 39.2 | $7.5544 \times 10^{9}$ |
| 39.44 | $7.4478 \times 10^{9}$ |
| 44.42 | $6.6372 \times 10^{9}$ |
| 44.91 | $6.5025 \times 10^{9}$ |
| 45.21 | $6.4621 \times 10^{9}$ |
| 45.64 | $6.3949 \times 10^{9}$ |
| 50.89 | $535085 \times 10^{9}$ |
| 51.29 | $5.4127 \times 10^{9}$ |
| 51.59 | $5.4164 \times 10^{9}$ |
| 51.84 | $5.3690 \times 10^{9}$ |
| 56.94 | $4.5566 \times 10^{9}$ |
| 57.31 | $4.6171 \times 10^{9}$ |
| 57.84 | $5.5845 \times 10^{9}$ |
| 57.94 | $4.4877 \times 10^{9}$ |
| 62.84 | $4.0690 \times 10^{9}$ |

TABLE 8-continued

Storage Modulus Data for Film 3a

| Temp. (° C.) | dynes/cm² |
|---|---|
| 63.28 | $4.1041 \times 10^{9}$ |
| 63.71 | $4.0419 \times 10^{9}$ |
| 63.89 | $4.0224 \times 10^{9}$ |
| 69.01 | $3.7750 \times 10^{9}$ |
| 69.37 | $3.8033 \times 10^{9}$ |
| 69.89 | $3.7603 \times 10^{9}$ |
| 70.06 | $3.7611 \times 10^{9}$ |
| 75.24 | $3.5707 \times 10^{9}$ |
| 75.43 | $3.6159 \times 10^{9}$ |
| 75.79 | $3.5808 \times 10^{9}$ |
| 76.19 | $3.5876 \times 10^{9}$ |
| 81.25 | $3.4355 \times 10^{9}$ |
| 81.87 | $3.4722 \times 10^{9}$ |
| 81.94 | $3.4380 \times 10^{9}$ |
| 82.70 | $3.4571 \times 10^{9}$ |
| 87.61 | $3.3164 \times 10^{9}$ |
| 87.82 | $3.3565 \times 10^{9}$ |
| 88.43 | $3.3323 \times 10^{9}$ |
| 88.47 | $3.3616 \times 10^{9}$ |
| 93.91 | $3.2162 \times 10^{9}$ |
| 94.15 | $3.2277 \times 10^{9}$ |
| 94.59 | $3.1973 \times 10^{9}$ |
| 94.90 | $3.2572 \times 10^{9}$ |
| 100.13 | $3.1397 \times 10^{9}$ |
| 100.16 | $3.1428 \times 10^{9}$ |
| 100.64 | $3.0981 \times 10^{9}$ |
| 100.76 | $3.1056 \times 10^{9}$ |
| 105.88 | $2.9780 \times 10^{9}$ |
| 106.36 | $3.0234 \times 10^{9}$ |
| 106.64 | $3.0100 \times 10^{9}$ |
| 106.96 | $3.0155 \times 10^{9}$ |
| 111.93 | $2.8487 \times 10^{9}$ |
| 112.27 | $2.8385 \times 10^{9}$ |
| 112.40 | $2.8499 \times 10^{9}$ |
| 113.05 | $2.8859 \times 10^{9}$ |
| 118.37 | $2.7151 \times 10^{9}$ |
| 118.41 | $2.7320 \times 10^{9}$ |
| 119.11 | $2.7044 \times 10^{9}$ |
| 119.25 | $2.7008 \times 10^{9}$ |
| 124.27 | $2.6068 \times 10^{9}$ |
| 124.79 | $2.5655 \times 10^{9}$ |
| 126.18 | $2.5143 \times 10^{9}$ |
| 126.19 | $2.5409 \times 10^{9}$ |
| 129.23 | $2.2899 \times 10^{9}$ |
| 129.72 | $2.2091 \times 10^{9}$ |
| 132.16 | $2.0021 \times 10^{9}$ |
| 132.76 | $1.8895 \times 10^{9}$ |
| 135.31 | $1.5885 \times 10^{9}$ |
| 135.62 | $1.5611 \times 10^{9}$ |
| 137.42 | $1.2629 \times 10^{9}$ |
| 137.82 | $1.2741 \times 10^{9}$ |
| 140.09 | $1.0151 \times 10^{9}$ |
| 142.39 | $7.3345 \times 10^{8}$ |
| 143.89 | $6.4483 \times 10^{8}$ |
| 145.05 | $5.4938 \times 10^{8}$ |
| 146.49 | $5.1329 \times 10^{8}$ |
| 146.80 | $5.0983 \times 10^{8}$ |
| 149.27 | $3.9676 \times 10^{8}$ |
| 151.18 | $3.1765 \times 10^{8}$ |
| 153.01 | $2.7748 \times 10^{8}$ |
| 154.14 | $2.4936 \times 10^{8}$ |
| 155.95 | $2.2184 \times 10^{8}$ |
| 158.71 | $1.7145 \times 10^{8}$ |

TABLE 9

Storage Modulus Data for Film 3b

| Temp. (° C.) | dynes/cm² |
|---|---|
| −50.41 | $2.4664 \times 10^{10}$ |
| −50.01 | $2.4369 \times 10^{10}$ |
| −48.23 | $2.4112 \times 10^{10}$ |

TABLE 9-continued

Storage Modulus Data for Film 3b

| Temp. (° C.) | dynes/cm$^2$ |
|---|---|
| −47.92 | $2.4053 \times 10^{10}$ |
| −45.15 | $2.3564 \times 10^{10}$ |
| −43.21 | $2.3292 \times 10^{10}$ |
| −41.49 | $2.3088 \times 10^{10}$ |
| −40.98 | $2.2993 \times 10^{10}$ |
| −38.88 | $2.2847 \times 10^{10}$ |
| −37.30 | $2.2517 \times 10^{10}$ |
| −34.62 | $2.2264 \times 10^{10}$ |
| −34.25 | $2.2013 \times 10^{10}$ |
| −33.21 | $2.1945 \times 10^{10}$ |
| −32.76 | $2.1834 \times 10^{10}$ |
| −28.91 | $2.1329 \times 10^{10}$ |
| −28.01 | $2.1159 \times 10^{10}$ |
| −27.01 | $2.1084 \times 10^{10}$ |
| −26.98 | $2.0891 \times 10^{10}$ |
| −24.30 | $2.0509 \times 10^{10}$ |
| −22.05 | $2.0109 \times 10^{10}$ |
| −20.95 | $2.0089 \times 10^{10}$ |
| −19.68 | $1.9917 \times 10^{10}$ |
| −18.24 | $1.9641 \times 10^{10}$ |
| −16.21 | $1.9217 \times 10^{10}$ |
| −14.73 | $1.9073 \times 10^{10}$ |
| −13.64 | $1.9002 \times 10^{10}$ |
| −11.97 | $1.8758 \times 10^{10}$ |
| −10.26 | $1.8463 \times 10^{10}$ |
| −9.02 | $1.8292 \times 10^{10}$ |
| −7.45 | $1.8147 \times 10^{10}$ |
| −5.72 | $1.7892 \times 10^{10}$ |
| −3.79 | $1.7583 \times 10^{10}$ |
| −2.41 | $1.7433 \times 10^{10}$ |
| −1.01 | $1.7285 \times 10^{10}$ |
| 0.29 | $1.7064 \times 10^{10}$ |
| 2.37 | $1.6680 \times 10^{10}$ |
| 3.45 | $1.6555 \times 10^{10}$ |
| 5.02 | $1.6371 \times 10^{10}$ |
| 6.41 | $1.6092 \times 10^{10}$ |
| 8.16 | $1.5669 \times 10^{10}$ |
| 9.75 | $1.5467 \times 10^{10}$ |
| 10.70 | $1.5404 \times 10^{10}$ |
| 12.16 | $1.5072 \times 10^{10}$ |
| 14.28 | $1.4497 \times 10^{10}$ |
| 15.19 | $1.4353 \times 10^{10}$ |
| 16.75 | $1.4198 \times 10^{10}$ |
| 18.28 | $1.3896 \times 10^{10}$ |
| 20.02 | $1.3416 \times 10^{10}$ |
| 21.24 | $1.3159 \times 10^{10}$ |
| 23.27 | $1.2899 \times 10^{10}$ |
| 23.94 | $1.2726 \times 10^{10}$ |
| 25.80 | $1.2283 \times 10^{10}$ |
| 27.25 | $1.1946 \times 10^{10}$ |
| 28.91 | $1.1741 \times 10^{10}$ |
| 31.91 | $1.1099 \times 10^{10}$ |
| 32.51 | $1.0834 \times 10^{10}$ |
| 33.25 | $1.0656 \times 10^{10}$ |
| 34.83 | $1.0466 \times 10^{10}$ |
| 36.18 | $1.0172 \times 10^{10}$ |
| 38.24 | $9.6482 \times 10^{9}$ |
| 39.34 | $9.4375 \times 10^{9}$ |
| 41.45 | $9.0205 \times 10^{9}$ |
| 42.40 | $8.7923 \times 10^{9}$ |
| 44.66 | $8.2566 \times 10^{9}$ |
| 45.45 | $8.1468 \times 10^{9}$ |
| 47.04 | $7.8914 \times 10^{9}$ |
| 48.65 | $7.5312 \times 10^{9}$ |
| 50.89 | $6.9242 \times 10^{9}$ |
| 51.71 | $6.8156 \times 10^{9}$ |
| 54.09 | $6.5618 \times 10^{9}$ |
| 54.74 | $6.4666 \times 10^{9}$ |
| 56.65 | $5.9667 \times 10^{9}$ |
| 57.68 | $5.7397 \times 10^{9}$ |
| 59.95 | $5.5415 \times 10^{9}$ |
| 61.03 | $5.5073 \times 10^{9}$ |
| 62.74 | $5.2716 \times 10^{9}$ |
| 63.72 | $5.0888 \times 10^{9}$ |
| 65.79 | $4.8959 \times 10^{9}$ |
| 66.75 | $4.8837 \times 10^{9}$ |
| 69.50 | $4.7127 \times 10^{9}$ |
| 70.40 | $4.6244 \times 10^{9}$ |
| 72.26 | $4.4925 \times 10^{9}$ |
| 73.25 | $4.4723 \times 10^{9}$ |
| 75.05 | $4.3926 \times 10^{9}$ |
| 76.24 | $4.3293 \times 10^{9}$ |
| 78.54 | $4.2043 \times 10^{9}$ |
| 79.44 | $4.1829 \times 10^{9}$ |
| 81.09 | $4.1323 \times 10^{9}$ |
| 82.57 | $4.0758 \times 10^{9}$ |
| 84.43 | $3.9970 \times 10^{9}$ |
| 85.70 | $3.9478 \times 10^{9}$ |
| 88.08 | $9.8951 \times 10^{9}$ |
| 88.59 | $3.8796 \times 10^{9}$ |
| 90.17 | $3.8107 \times 10^{9}$ |
| 90.51 | $3.7915 \times 10^{9}$ |
| 94.16 | $3.7313 \times 10^{9}$ |
| 94.95 | $3.7099 \times 10^{9}$ |
| 97.05 | $3.6437 \times 10^{9}$ |
| 97.22 | $3.6423 \times 10^{9}$ |
| 100.39 | $3.5942 \times 10^{9}$ |
| 101.02 | $3.5843 \times 10^{9}$ |
| 102.37 | $3.5230 \times 10^{9}$ |
| 103.17 | $3.4983 \times 10^{9}$ |
| 105.88 | $3.4549 \times 10^{9}$ |
| 107.08 | $3.4401 \times 10^{9}$ |
| 108.99 | $3.3678 \times 10^{9}$ |
| 109.72 | $3.3475 \times 10^{9}$ |
| 112.10 | $3.2794 \times 10^{9}$ |
| 113.04 | $3.2737 \times 10^{9}$ |
| 114.89 | $3.2130 \times 10^{9}$ |
| 116.06 | $3.1864 \times 10^{9}$ |
| 117.70 | $3.1443 \times 10^{9}$ |
| 118.86 | $3.1254 \times 10^{9}$ |
| 121.09 | $3.0626 \times 10^{9}$ |
| 123.34 | $2.9972 \times 10^{9}$ |
| 124.23 | $2.9483 \times 10^{9}$ |
| 126.24 | $2.8894 \times 10^{9}$ |
| 126.37 | $2.873 \times 10^{9}$ |
| 128.79 | $2.7081 \times 10^{9}$ |
| 129.43 | $2.6424 \times 10^{9}$ |
| 132.30 | $2.3831 \times 10^{9}$ |
| 132.79 | $2.3067 \times 10^{9}$ |
| 135.21 | $2.0327 \times 10^{9}$ |
| 135.45 | $2.0399 \times 10^{9}$ |
| 138.36 | $1.6946 \times 10^{9}$ |
| 138.58 | $1.6228 \times 10^{9}$ |
| 140.77 | $1.3441 \times 10^{9}$ |
| 141.86 | $1.2804 \times 10^{9}$ |
| 143.55 | $1.1399 \times 10^{9}$ |
| 144.12 | $1.1306 \times 10^{9}$ |
| 148.04 | $8.8172 \times 10^{8}$ |
| 148.44 | $7.6143 \times 10^{8}$ |
| 149.99 | $7.3849 \times 10^{8}$ |
| 151.54 | $7.2438 \times 10^{8}$ |
| 152.46 | $6.9227 \times 10^{8}$ |
| 155.23 | $6.9381 \times 10^{8}$ |
| 155.29 | $6.5819 \times 10^{8}$ |
| 155.41 | $5.8816 \times 10^{8}$ |
| 160.54 | $6.6372 \times 10^{8}$ |
| 163.77 | $6.8309 \times 10^{8}$ |

TABLE 10

Storage Modulus Data for Film 4

| Temp. (° C.) | dynes/cm$^2$ |
|---|---|
| −52.42 | $2.3917 \times 10^{10}$ |
| −51.84 | $2.3705 \times 10^{10}$ |

TABLE 10-continued

Storage Modulus Data for Film 4

| Temp. (° C.) | dynes/cm$^2$ |
|---|---|
| −49.05 | 2.3047 × 10$^{10}$ |
| −48.51 | 2.2941 × 10$^{10}$ |
| −45.81 | 2.2388 × 10$^{10}$ |
| −45.25 | 2.2325 × 10$^{10}$ |
| −42.31 | 2.1930 × 10$^{10}$ |
| −41.84 | 2.1768 × 10$^{10}$ |
| −39.10 | 2.1443 × 10$^{10}$ |
| −38.63 | 2.1312 × 10$^{10}$ |
| −36.03 | 2.1036 × 10$^{10}$ |
| −35.59 | 2.0927 × 10$^{10}$ |
| −32.95 | 2.0628 × 10$^{10}$ |
| −32.43 | 2.0492 × 10$^{10}$ |
| −29.70 | 2.0175 × 10$^{10}$ |
| −29.55 | 2.0069 × 10$^{10}$ |
| −26.63 | 1.9686 × 10$^{10}$ |
| −26.48 | 1.9594 × 10$^{10}$ |
| −23.48 | 1.9212 × 10$^{10}$ |
| −23.32 | 1.9112 × 10$^{10}$ |
| −20.41 | 1.8728 × 10$^{10}$ |
| −20.16 | 1.8593 × 10$^{10}$ |
| −17.23 | 1.8210 × 10$^{10}$ |
| −17.01 | 1.2022 × 10$^{10}$ |
| −14.16 | 1.7716 × 10$^{10}$ |
| −13.90 | 1.7576 × 10$^{10}$ |
| −10.91 | 1.7190 × 10$^{10}$ |
| −10.83 | 1.7066 × 10$^{10}$ |
| −7.79 | 1.6650 × 10$^{10}$ |
| −7.68 | 1.6511 × 10$^{10}$ |
| −4.70 | 1.5977 × 10$^{10}$ |
| −4.50 | 1.5924 × 10$^{10}$ |
| −1.39 | 1.5454 × 10$^{10}$ |
| −1.33 | 1.5290 × 10$^{10}$ |
| 1.57 | 1.4714 × 10$^{10}$ |
| 1.63 | 1.4554 × 10$^{10}$ |
| 4.49 | 1.3927 × 10$^{10}$ |
| 4.53 | 1.4012 × 10$^{10}$ |
| 7.47 | 1.3347 × 10$^{10}$ |
| 7.57 | 1.3190 × 10$^{10}$ |
| 10.44 | 1.2585 × 10$^{10}$ |
| 10.45 | 1.2448 × 10$^{10}$ |
| 13.44 | 1.1852 × 10$^{10}$ |
| 13.49 | 1.1888 × 10$^{10}$ |
| 16.46 | 1.1356 × 10$^{10}$ |
| 16.48 | 1.1224 × 10$^{10}$ |
| 19.49 | 1.0650 × 10$^{10}$ |
| 19.59 | 1.0573 × 10$^{10}$ |
| 22.47 | 1.0092 × 10$^{10}$ |
| 22.55 | 1.0190 × 10$^{10}$ |
| 25.43 | 9.6849 × 10$^9$ |
| 25.61 | 9.5500 × 10$^9$ |
| 28.57 | 9.0073 × 10$^9$ |
| 28.59 | 9.0568 × 10$^9$ |
| 31.68 | 8.5424 × 10$^9$ |
| 31.78 | 8.5442 × 10$^9$ |
| 34.50 | 7.8475 × 10$^9$ |
| 34.70 | 7.8610 × 10$^9$ |
| 37.67 | 7.2521 × 10$^9$ |
| 37.78 | 7.2925 × 10$^9$ |
| 40.81 | 6.5425 × 10$^9$ |
| 41.00 | 6.4905 × 10$^9$ |
| 43.93 | 5.8618 × 10$^9$ |
| 44.05 | 5.9602 × 10$^9$ |
| 47.03 | 5.4072 × 10$^9$ |
| 47.15 | 5.3740 × 10$^9$ |
| 50.18 | 4.8957 × 10$^9$ |
| 50.18 | 4.9223 × 10$^9$ |
| 53.05 | 4.6050 × 10$^9$ |
| 53.21 | 4.6408 × 10$^9$ |
| 55.99 | 4.3713 × 10$^9$ |
| 56.15 | 4.3421 × 10$^9$ |
| 59.19 | 4.1243 × 10$^9$ |
| 59.21 | 1.1664 × 10$^9$ |
| 62.12 | 3.9856 × 10$^9$ |
| 62.24 | 4.0212 × 10$^9$ |
| 65.18 | 3.8889 × 10$^9$ |

TABLE 10-continued

Storage Modulus Data for Film 4

| Temp. (° C.) | dynes/cm$^2$ |
|---|---|
| 65.22 | 3.8539 × 10$^9$ |
| 68.21 | 3.7211 × 10$^9$ |
| 68.22 | 3.7631 × 10$^9$ |
| 71.22 | 3.6587 × 10$^9$ |
| 71.34 | 3.6928 × 10$^9$ |
| 74.39 | 3.3033 × 10$^9$ |
| 74.40 | 3.5581 × 10$^9$ |
| 77.40 | 3.4916 × 10$^9$ |
| 77.50 | 3.5237 × 10$^9$ |
| 80.28 | 3.4634 × 10$^9$ |
| 80.57 | 3.4899 × 10$^9$ |
| 83.54 | 3.4192 × 10$^9$ |
| 83.57 | 3.3877 × 10$^9$ |
| 86.61 | 3.3291 × 10$^9$ |
| 86.71 | 3.3425 × 10$^9$ |
| 89.66 | 3.2489 × 10$^9$ |
| 89.70 | 3.2554 × 10$^9$ |
| 92.84 | 3.1109 × 10$^9$ |
| 92.86 | 3.0948 × 10$^9$ |
| 95.79 | 2.9381 × 10$^9$ |
| 95.92 | 2.9156 × 10$^9$ |
| 98.86 | 2.7173 × 10$^9$ |
| 99.02 | 2.6760 × 10$^9$ |
| 101.95 | 2.4862 × 10$^9$ |
| 102.24 | 2.4191 × 10$^9$ |
| 104.86 | 2.2695 × 10$^9$ |
| 104.94 | 2.2010 × 10$^9$ |
| 107.64 | 2.0789 × 10$^9$ |
| 107.94 | 1.9828 × 10$^9$ |
| 110.86 | 1.8974 × 10$^9$ |
| 110.90 | 1.8063 × 10$^9$ |
| 114.07 | 1.7439 × 10$^9$ |
| 114.08 | 1.7093 × 10$^9$ |
| 116.80 | 1.7442 × 10$^9$ |
| 116.93 | 1.6400 × 10$^9$ |
| 119.70 | 1.7033 × 10$^9$ |
| 119.93 | 1.6007 × 10$^9$ |
| 123.04 | 1.7557 × 10$^9$ |
| 123.25 | 1.7170 × 10$^9$ |
| 126.00 | 1.7714 × 10$^9$ |
| 126.18 | 1.7088 × 10$^9$ |
| 128.84 | 1.7506 × 10$^9$ |
| 129.13 | 1.7251 × 10$^9$ |
| 132.08 | 1.7047 × 10$^9$ |
| 132.16 | 1.6863 × 10$^9$ |
| 134.88 | 1.6071 × 10$^9$ |
| 135.30 | 1.5943 × 10$^9$ |
| 138.04 | 1.4887 × 10$^9$ |
| 138.27 | 1.4771 × 10$^9$ |
| 141.13 | 1.3545 × 10$^9$ |
| 141.28 | 1.3225 × 10$^9$ |
| 144.21 | 1.1720 × 10$^9$ |
| 144.25 | 1.1800 × 10$^8$ |
| 147.32 | 9.8903 × 10$^8$ |
| 147.42 | 9.9789 × 10$^8$ |
| 150.34 | 8.2450 × 10$^8$ |
| 150.55 | 7.8430 × 10$^8$ |

TABLE 11

Storage Modulus Data for Film 5

| Temp. (° C.) | dynes/cm$^2$ |
|---|---|
| −52.14 | 2.5201 × 10$^{10}$ |
| −51.73 | 2.5071 × 10$^{10}$ |
| −48.70 | 2.4403 × 10$^{10}$ |
| −48.27 | 2.4294 × 10$^{10}$ |
| −45.41 | 2.3786 × 10$^{10}$ |
| −45.16 | 2.3765 × 10$^{10}$ |
| −42.12 | 2.3400 × 10$^{10}$ |

TABLE 11-continued

Storage Modulus Data for Film 5

| Temp. (° C.) | dynes/cm$^2$ |
|---|---|
| −41.90 | $2.3257 \times 10^{10}$ |
| −39.05 | $2.2966 \times 10^{10}$ |
| −38.73 | $2.2828 \times 10^{10}$ |
| −35.72 | $2.2580 \times 10^{10}$ |
| −35.63 | $2.2469 \times 10^{10}$ |
| −32.73 | $2.2199 \times 10^{10}$ |
| −32.61 | $2.2075 \times 10^{10}$ |
| −29.65 | $2.1784 \times 10^{10}$ |
| −29.50 | $2.1678 \times 10^{10}$ |
| −26.52 | $2.1365 \times 10^{10}$ |
| −26.38 | $2.1238 \times 10^{10}$ |
| −23.57 | $2.0842 \times 10^{10}$ |
| −23.45 | $2.0800 \times 10^{10}$ |
| −20.30 | $2.0398 \times 10^{10}$ |
| −20.21 | $2.0340 \times 10^{10}$ |
| −17.39 | $1.9919 \times 10^{10}$ |
| −17.10 | $1.9799 \times 10^{10}$ |
| −14.05 | $1.9369 \times 10^{10}$ |
| −14.01 | $1.9376 \times 10^{10}$ |
| −10.91 | $18833 \times 10^{10}$ |
| −10.87 | $1.8824 \times 10^{10}$ |
| −7.82 | $1.8280 \times 10^{10}$ |
| −7.75 | $1.8270 \times 10^{10}$ |
| −4.77 | $1.7699 \times 10^{10}$ |
| −4.66 | $1.7672 \times 10^{10}$ |
| −1.55 | $1.17083 \times 10^{10}$ |
| −1.38 | $1.6980 \times 10^{10}$ |
| 1.43 | $1.6350 \times 10^{10}$ |
| 1.51 | $1.6293 \times 10^{10}$ |
| 4.53 | $1.5518 \times 10^{10}$ |
| 4.59 | $1.5601 \times 10^{10}$ |
| 7.40 | $1.4887 \times 10^{10}$ |
| 7.52 | $1.4810 \times 10^{10}$ |
| 10.31 | $1.4102 \times 10^{10}$ |
| 10.45 | $1.4023 \times 10^{10}$ |
| 13.30 | $1.3357 \times 10^{10}$ |
| 13.34 | $1.3429 \times 10^{10}$ |
| 16.30 | $1.2743 \times 10^{10}$ |
| 16.30 | $1.2740 \times 10^{10}$ |
| 19.41 | $1.2096 \times 10^{10}$ |
| 19.43 | $1.2074 \times 10^{10}$ |
| 22.34 | $1.1505 \times 10^{10}$ |
| 22.42 | $1.1527 \times 10^{10}$ |
| 25.47 | $1.0945 \times 10^{10}$ |
| 25.76 | $1.0880 \times 10^{10}$ |
| 28.38 | $1.0386 \times 10^{10}$ |
| 28.54 | $1.0323 \times 10^{10}$ |
| 31.59 | $9.6611 \times 10^{9}$ |
| 31.61 | $9.6496 \times 10^{9}$ |
| 34.57 | $8.9423 \times 10^{9}$ |
| 34.77 | $8.9220 \times 10^{9}$ |
| 37.28 | $8.2055 \times 10^{9}$ |
| 37.71 | $8.1548 \times 10^{9}$ |
| 40.81 | $7.3347 \times 10^{9}$ |
| 41.00 | $7.3099 \times 10^{9}$ |
| 43.85 | $6.6204 \times 10^{9}$ |
| 43.94 | $6.6442 \times 10^{9}$ |
| 46.91 | $6.0003 \times 10^{9}$ |
| 46.98 | $5.9859 \times 10^{9}$ |
| 50.06 | $5.4902 \times 10^{9}$ |
| 50.09 | $5.4786 \times 10^{9}$ |
| 52.89 | $5.1273 \times 10^{9}$ |
| 53.02 | $5.1046 \times 10^{9}$ |
| 55.96 | $4.8243 \times 10^{9}$ |
| 56.18 | $4.8107 \times 10^{9}$ |
| 59.10 | $4.5987 \times 10^{9}$ |
| 59.11 | $4.5864 \times 10^{9}$ |
| 62.12 | $4.4226 \times 10^{9}$ |
| 62.34 | $4.4087 \times 10^{9}$ |
| 65.01 | $4.2888 \times 10^{9}$ |
| 65.02 | $4.2871 \times 10^{9}$ |
| 68.28 | $4.1676 \times 10^{9}$ |
| 68.32 | $4.1701 \times 10^{9}$ |
| 71.22 | $4.0727 \times 10^{9}$ |
| 71.26 | $4.0786 \times 10^{9}$ |
| 74.52 | $4.0060 \times 10^{9}$ |
| 74.52 | $4.0082 \times 10^{9}$ |
| 77.30 | $3.9648 \times 10^{9}$ |
| 77.45 | $3.9573 \times 10^{9}$ |
| 80.32 | $3.9197 \times 10^{9}$ |
| 80.46 | $3.9172 \times 10^{9}$ |
| 83.44 | $3.8854 \times 10^{9}$ |
| 83.54 | $3.8820 \times 10^{9}$ |
| 86.63 | $3.8328 \times 10^{9}$ |
| 86.73 | $3.8260 \times 10^{9}$ |
| 89.81 | $3.7586 \times 10^{9}$ |
| 89.83 | $3.7559 \times 10^{9}$ |
| 92.77 | $3.6633 \times 10^{9}$ |
| 92.92 | $3.6617 \times 10^{9}$ |
| 95.76 | $3.5375 \times 10^{9}$ |
| 95.89 | $3.5341 \times 10^{9}$ |
| 98.73 | $3.3832 \times 10^{9}$ |
| 98.88 | $3.3861 \times 10^{9}$ |
| 101.68 | $3.2413 \times 10^{9}$ |
| 101.89 | $3.2341 \times 10^{9}$ |
| 104.82 | $3.0791 \times 10^{9}$ |
| 104.83 | $3.0765 \times 10^{9}$ |
| 107.70 | $2.9389 \times 10^{9}$ |
| 107.98 | $2.9320 \times 10^{9}$ |
| 110.78 | $2.8024 \times 10^{9}$ |
| 110.86 | $2.7997 \times 10^{9}$ |
| 113.72 | $2.6740 \times 10^{9}$ |
| 113.81 | $2.6703 \times 10^{9}$ |
| 116.73 | $2.5519 \times 10^{9}$ |
| 116.89 | $2.5499 \times 10^{9}$ |
| 119.91 | $2.4231 \times 10^{9}$ |
| 120.09 | $2.4217 \times 10^{9}$ |
| 123.30 | $2.2910 \times 10^{9}$ |
| 123.35 | $2.2880 \times 10^{9}$ |
| 126.20 | $2.1812 \times 10^{9}$ |
| 126.38 | $2.1737 \times 10^{9}$ |
| 129.00 | $2.0617 \times 10^{9}$ |
| 129.21 | $2.0576 \times 10^{9}$ |
| 131.86 | $1.9265 \times 10^{9}$ |
| 132.16 | $1.9179 \times 10^{9}$ |
| 135.06 | $1.7778 \times 10^{9}$ |
| 135.16 | $1.7727 \times 10^{9}$ |
| 138.13 | $1.5815 \times 10^{9}$ |
| 138.38 | $1.5786 \times 10^{9}$ |
| 141.09 | $1.3978 \times 10^{9}$ |
| 141.20 | $1.4153 \times 10^{9}$ |
| 144.22 | $1.2214 \times 10^{9}$ |
| 144.24 | $1.2024 \times 10^{9}$ |
| 147.18 | $1.0496 \times 10^{9}$ |
| 147.31 | $1.0555 \times 10^{9}$ |
| 150.25 | $9.2776 \times 10^{8}$ |
| 150.42 | $9.4483 \times 10^{8}$ |

What is claimed is:

1. A coextruded sterilizable film for aseptic packaging, said film comprising:
   a. a core layer having first and second major surfaces, said core layer comprising a polyamide;
   b. a first intermediate layer adjacent to the first major surface of the core layer, said first intermediate layer comprising ethylene vinyl alcohol copolymer;
   c. a second intermediate layer adjacent to the second major surface of the core layer, said second intermediate layer comprising a polyamide;
   d. a first outer layer comprising an olefinic copolymer;
   e. a second outer layer comprising a blend of a cyclic olefin copolymer and an olefinic copolymer, wherein said cyclic olefin copolymer has a glass transition temperature of at least 80° C., and wherein said olefinic copolymer has a melting point of at least 125° C.;

f. a first tie layer adhering the first intermediate layer to the first outer layer; and g. a second tie layer adhering the second intermediate layer to the second outer layer;

wherein said film has a storage modulus of at least $10^9$ dynes/cm$^2$ at temperatures up to 140° C.

2. The film of claim 1, wherein said polyamide core layer comprises nylon 6.

3. The film of claim 1, wherein said ethylene vinyl alcohol copolymer of the first intermediate layer has an ethylene content of about 20 mole % to about 48 mole %.

4. A printed sterilizable laminate for aseptic packaging, said laminate comprising:

a. a first coextruded multilayer film comprising:
  i. a core layer having first and second major surfaces, said core layer comprising a polyamide;
  ii. a first intermediate layer adjacent to the first major surface of the core layer, said first intermediate layer comprising ethylene vinyl alcohol copolymer;
  iii. a second intermediate layer adjacent to the second major surface of the core layer, said second intermediate layer comprising a polyamide;
  iv. a first outer layer comprising an olefinic copolymer;
  v. a second outer layer comprising a blend of a cyclic olefin copolymer and an olefinic copolymer, wherein said cyclic olefin copolymer has a glass transition temperature of at least 80° C., and wherein said olefinic copolymer has a melting point of at least 125° C.;
  vi. a first tie layer adhering the first intermediate layer to the first outer layer; and
  vii. a second tie layer adhering the second intermediate layer to the second outer layer;

b. a second coextruded multilayer film comprising:
  i. a core layer having first and second major surfaces, said core layer comprising a polyamide;
  ii. a first intermediate layer adjacent to the first major surface of the core layer, said first intermediate layer comprising ethylene vinyl alcohol copolymer;
  iii. a second intermediate layer adjacent to the second major surface of the core layer, said second intermediate layer comprising a polyamide;
  iv. a first outer layer comprising an olefinic copolymer;
  v. a second outer layer comprising a blend of a cyclic olefin copolymer and an olefinic copolymer, wherein said cyclic olefin copolymer has a glass transition temperature of at least 80° C., and wherein said olefinic copolymer has a melting point of at least 125° C.;
  vi. a first tie layer adhering the first intermediate layer to the first outer layer; and
  vii. a second tie layer adhering the second intermediate layer to the second outer layer;

c. a printed image disposed on the outside surface of the first coextruded multilayer film, or the inside surface of the second coextruded multilayer film; and d. an adhesive that bonds the first outer layer of the first coextruded multilayer film to the second outer layer of the second coextruded multilayer film;

wherein said laminate has a storage modulus of at least $10^9$ dynes/cm$^2$ at temperatures up to 140° C.

5. The laminate of claim 4, wherein said polyamide core layer of said first and second films comprises nylon 6.

6. The laminate of claim 4, wherein said ethylene vinyl alcohol copolymer of the first intermediate layer of said first and second films comprises an ethylene content of about 20 mole % to about 48 mole %.

7. The laminate of claim 4, wherein:

a. the first outer layer of the first coextruded multilayer film has a corona-treated surface;

b. the second outer layer of the second coextruded multilayer film has a corona-treated surface;

c. the first outer layer of the second coextruded multilayer film has a non-corona-treated surface; and d. the second outer layer of the first coextruded multilayer film, has a non-corona-treated surface.

* * * * *